(12) United States Patent
Beers et al.

(10) Patent No.: US 10,268,583 B2
(45) Date of Patent: *Apr. 23, 2019

(54) HIGH PERFORMANCE INTERCONNECT COHERENCE PROTOCOL RESOLVING CONFLICT BASED ON HOME TRANSACTION IDENTIFIER DIFFERENT FROM REQUESTER TRANSACTION IDENTIFIER

(71) Applicant: Intel Corporation, Santa Clara, CA (US)

(72) Inventors: Robert Beers, Hillsboro, OR (US); Robert G. Blankenship, Tacoma, WA (US); Robert J. Safranek, Portland, OR (US); Jeff Willey, Timnath, CO (US); Robert A. Maddox, Columbia, SC (US); Aaron T. Spink, San Francisco, CA (US)

(73) Assignee: Intel Corporation, Santa Clara, CA (US)

( * ) Notice: Subject to any disclaimer, the term of this patent is extended or adjusted under 35 U.S.C. 154(b) by 346 days.

This patent is subject to a terminal disclaimer.

(21) Appl. No.: 13/976,957

(22) PCT Filed: Mar. 15, 2013

(86) PCT No.: PCT/US2013/032670
§ 371 (c)(1),
(2) Date: Jun. 27, 2013

(87) PCT Pub. No.: WO2014/065876
PCT Pub. Date: May 1, 2014

(65) Prior Publication Data
US 2014/0115268 A1    Apr. 24, 2014

Related U.S. Application Data

(60) Provisional application No. 61/717,091, filed on Oct. 22, 2012.

(51) Int. Cl.
G06F 12/0831    (2016.01)
G06F 12/0817    (2016.01)

(52) U.S. Cl.
CPC ...... *G06F 12/0831* (2013.01); *G06F 12/0828* (2013.01); *G06F 2212/621* (2013.01)

(58) Field of Classification Search
None
See application file for complete search history.

(56) References Cited

U.S. PATENT DOCUMENTS 5,966,729 A    10/1999    Phelps
6,009,488 A    12/1999    Kavipurapu
(Continued)

OTHER PUBLICATIONS

International Search Report and Written Opinion received for the PCT Patent Application No. PCT/US2013/032670, dated Jul. 15, 2013, 8 pages.
(Continued)

*Primary Examiner* — Ann J Lo
*Assistant Examiner* — Chie Yew
(74) *Attorney, Agent, or Firm* — Alliance IP, LLC

(57) ABSTRACT

A coherence protocol message is sent corresponding to a particular cache line. A potential conflict involving the particular cache line is identified and a forward request is sent to a home agent to identify the potential conflict. A forward response can be received in response to the forward request from the home agent and a response to the conflict can be determined.

25 Claims, 9 Drawing Sheets

(56) References Cited

U.S. PATENT DOCUMENTS

| | | | |
|---|---|---|---|
| 6,519,649 B1* | 2/2003 | Arimilli | G06F 12/0813 709/200 |
| 6,631,401 B1 | 10/2003 | Keller et al. | |
| 6,631,448 B2 | 10/2003 | Weber | |
| 6,704,842 B1 | 3/2004 | Janakiraman et al. | |
| 6,922,756 B2 | 7/2005 | Hum et al. | |
| 6,954,829 B2 | 10/2005 | Beers et al. | |
| 7,107,409 B2 | 9/2006 | Glasco | |
| 7,512,741 B1* | 3/2009 | Batson | G06F 12/0833 370/329 |
| 7,536,515 B2 | 5/2009 | Spink et al. | |
| 7,721,050 B2* | 5/2010 | Hum et al. | 711/141 |
| 2004/0122966 A1* | 6/2004 | Hum et al. | 709/232 |
| 2004/0123045 A1 | 6/2004 | Hum et al. | |
| 2004/0123047 A1 | 6/2004 | Hum et al. | |
| 2005/0144400 A1 | 6/2005 | Hum et al. | |
| 2005/0160132 A1* | 7/2005 | Van Doren et al. | 709/200 |
| 2005/0160230 A1 | 7/2005 | Doren et al. | |
| 2005/0237941 A1 | 10/2005 | Hum et al. | |
| 2005/0240734 A1 | 10/2005 | Batson et al. | |
| 2005/0251599 A1* | 11/2005 | Hum | G06F 15/17381 710/100 |
| 2005/0262250 A1* | 11/2005 | Batson | G06F 12/0831 709/230 |
| 2006/0053257 A1 | 3/2006 | Sistla et al. | |
| 2007/0073856 A1* | 3/2007 | Tsien | G06F 12/0831 709/223 |
| 2008/0005482 A1 | 1/2008 | Beers et al. | |
| 2008/0005483 A1 | 1/2008 | Spink et al. | |
| 2008/0109565 A1* | 5/2008 | Ajanovic et al. | 710/8 |
| 2008/0162661 A1* | 7/2008 | Mannava et al. | 709/213 |
| 2009/0157981 A1 | 6/2009 | Kinter et al. | |
| 2010/0005245 A1 | 1/2010 | Beers et al. | |
| 2011/0078492 A1 | 3/2011 | Kumar et al. | |
| 2015/0089161 A1 | 3/2015 | Beers et al. | |

OTHER PUBLICATIONS

PCT Corrected International Search Report and Written Opinion in PCT International Patent Application No. PCT/US2013/032670, dated Jan. 20, 2015 (8 pages).

PCT International Preliminary Report on Patentability in PCT International Patent Application No. PCT/US2013/032670, dated Apr. 28, 2015 (6 pages).

Korean Patent Office Notice of Preliminary Rejection in Application No. 1020157007216 dated Jan. 5, 2016.

* cited by examiner

HIGH PERFORMANCE INTERCONNECT COHERENCE PROTOCOL RESOLVING CONFLICT BASED ON HOME TRANSACTION IDENTIFIER DIFFERENT FROM REQUESTER TRANSACTION IDENTIFIER

CROSS-REFERENCE TO RELATED APPLICATIONS

This application is a national stage application under 35 U.S.C. § 371 of PCT International Application Ser. No. PCT/US2013/032670, filed on Mar. 15, 2013 and entitled HIGH PERFORMANCE INTERCONNECT COHERENCE PROTOCOL, which application claims the benefit of priority to U.S. Provisional Patent Application Ser. No. 61/717,091 filed on Oct. 22, 2012 and entitled METHOD, APPARATUS, SYSTEM FOR A HIGH PERFORMANCE INTERCONNECT ARCHITECTURE. The disclosures of the prior applications are considered part of and are hereby incorporated by reference in their entirety in the disclosure of this application.

FIELD

The present disclosure relates in general to the field of computer development, and more specifically, to software development involving coordination of mutually-dependent constrained systems.

BACKGROUND

Advances in semi-conductor processing and logic design have permitted an increase in the amount of logic that may be present on integrated circuit devices. As a corollary, computer system configurations have evolved from a single or multiple integrated circuits in a system to multiple cores, multiple hardware threads, and multiple logical processors present on individual integrated circuits, as well as other interfaces integrated within such processors. A processor or integrated circuit typically comprises a single physical processor die, where the processor die may include any number of cores, hardware threads, logical processors, interfaces, memory, controller hubs, etc.

As a result of the greater ability to fit more processing power in smaller packages, smaller computing devices have increased in popularity. Smartphones, tablets, ultrathin notebooks, and other user equipment have grown exponentially. However, these smaller devices are reliant on servers both for data storage and complex processing that exceeds the form factor. Consequently, the demand in the high-performance computing market (i.e. server space) has also increased. For instance, in modern servers, there is typically not only a single processor with multiple cores, but also multiple physical processors (also referred to as multiple sockets) to increase the computing power. But as the processing power grows along with the number of devices in a computing system, the communication between sockets and other devices becomes more critical.

In fact, interconnects have grown from more traditional multi-drop buses that primarily handled electrical communications to full blown interconnect architectures that facilitate fast communication. Unfortunately, as the demand for future processors to consume at even higher-rates corresponding demand is placed on the capabilities of existing interconnect architectures.

BRIEF DESCRIPTION OF THE DRAWINGS

Like reference numbers and designations in the various drawings indicate like elements.

DETAILED DESCRIPTION

Figure 1:
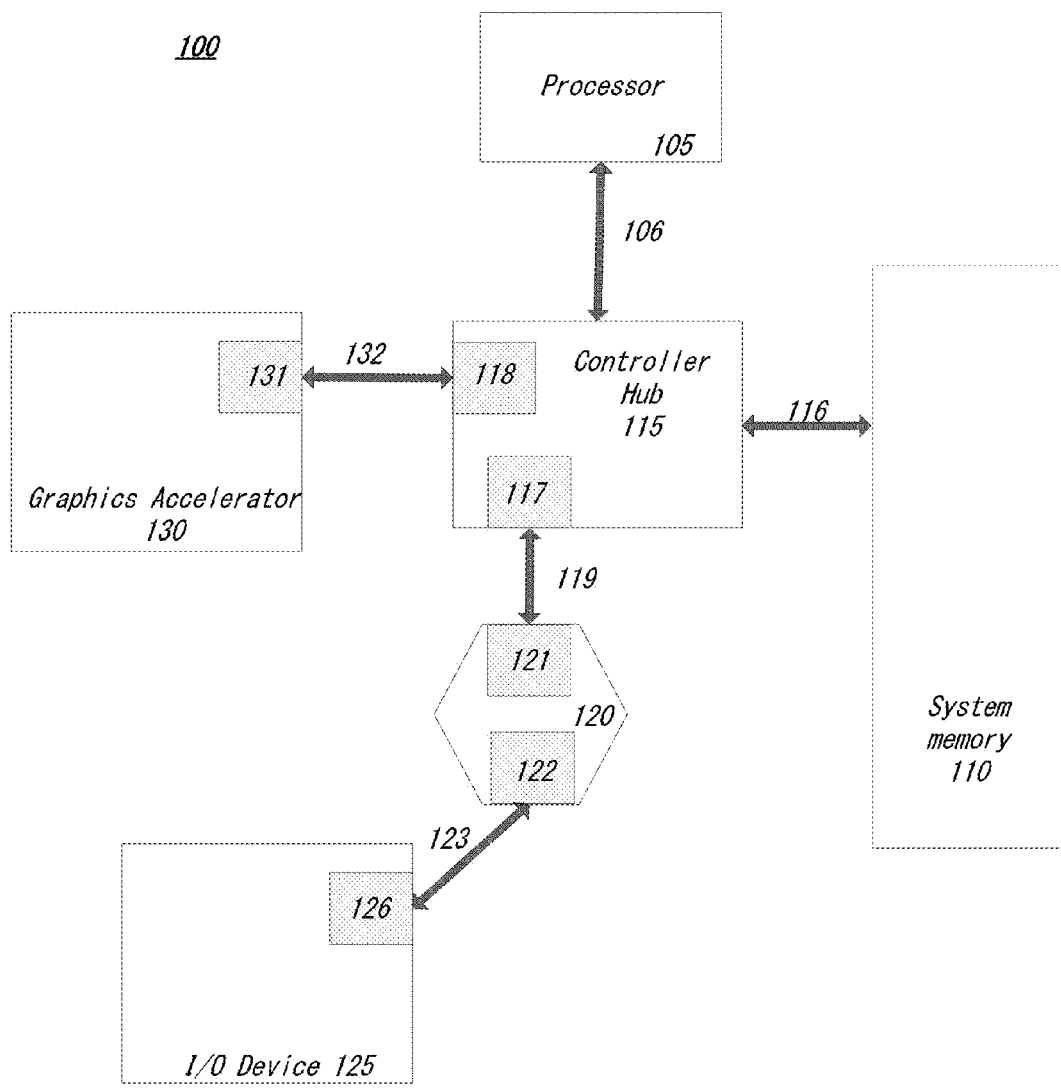
FIG. 1 illustrates a simplified block diagram of a system including a point-to-point interconnect to connect I/O devices in a computer system in accordance with one embodiment.

In the following description, numerous specific details are set forth, such as examples of specific types of processors and system configurations, specific hardware structures, specific architectural and micro architectural details, specific register configurations, specific instruction types, specific system components, specific processor pipeline stages, specific interconnect layers, specific packet/transaction configurations, specific transaction names, specific protocol exchanges, specific link widths, specific implementations, and operation etc. in order to provide a thorough understanding of the present invention. It may be apparent, however, to one skilled in the art that these specific details need not necessarily be employed to practice the subject matter of the present disclosure. In other instances, well detailed description of known components or methods has been avoided, such as specific and alternative processor architectures, specific logic circuits/code for described algorithms, specific firmware code, low-level interconnect operation, specific logic configurations, specific manufacturing techniques and materials, specific compiler implementations, specific expression of algorithms in code, specific power down and gating techniques/logic and other specific operational details of computer system in order to avoid unnecessarily obscuring the present disclosure.

Although the following embodiments may be described with reference to energy conservation, energy efficiency, processing efficiency, and so on in specific integrated circuits, such as in computing platforms or microprocessors, other embodiments are applicable to other types of integrated circuits and logic devices. Similar techniques and teachings of embodiments described herein may be applied to other types of circuits or semiconductor devices that may also benefit from such features. For example, the disclosed embodiments are not limited to server computer system, desktop computer systems, laptops, Ultrabooks™, but may be also used in other devices, such as handheld devices, smartphones, tablets, other thin notebooks, systems on a chip (SOC) devices, and embedded applications. Some examples of handheld devices include cellular phones, Internet protocol devices, digital cameras, personal digital assistants (PDAs), and handheld PCs. Here, similar techniques for a high-performance interconnect may be applied to increase performance (or even save power) in a low power interconnect. Embedded applications typically include a microcontroller, a digital signal processor (DSP), a system on a chip, network computers (NetPC), set-top boxes, network hubs, wide area network (WAN) switches, or any other system that can perform the functions and operations taught below. Moreover, the apparatus', methods, and systems described herein are not limited to physical computing devices, but may also relate to software optimizations for energy conservation and efficiency. As may become readily apparent in the description below, the embodiments of methods, apparatus', and systems described herein (whether in reference to hardware, firmware, software, or a combination thereof) may be considered vital to a "green technology" future balanced with performance considerations.

As computing systems are advancing, the components therein are becoming more complex. The interconnect architecture to couple and communicate between the components has also increased in complexity to ensure bandwidth demand is met for optimal component operation. Furthermore, different market segments demand different aspects of interconnect architectures to suit the respective market. For example, servers require higher performance, while the mobile ecosystem is sometimes able to sacrifice overall performance for power savings. Yet, it is a singular purpose of most fabrics to provide highest possible performance with maximum power saving. Further, a variety of different interconnects can potentially benefit from subject matter described herein. For instance, the Peripheral Component Interconnect (PCI) Express (PCIe) interconnect fabric architecture and QuickPath Interconnect (QPI) fabric architecture, among other examples, can potentially be improved according to one or more principles described herein, among other examples.

FIG. 1 illustrates one embodiment of a fabric composed of point-to-point Links that interconnect a set of components is illustrated. System 100 includes processor 105 and system memory 110 coupled to controller hub 115. Processor 105 can include any processing element, such as a microprocessor, a host processor, an embedded processor, a co-processor, or other processor. Processor 105 is coupled to controller hub 115 through front-side bus (FSB) 106. In one embodiment, FSB 106 is a serial point-to-point interconnect as described below. In another embodiment, link 106 includes a serial, differential interconnect architecture that is compliant with different interconnect standard.

System memory 110 includes any memory device, such as random access memory (RAM), non-volatile (NV) memory, or other memory accessible by devices in system 100. System memory 110 is coupled to controller hub 115 through memory interface 116. Examples of a memory interface include a double-data rate (DDR) memory interface, a dual-channel DDR memory interface, and a dynamic RAM (DRAM) memory interface.

In one embodiment, controller hub 115 can include a root hub, root complex, or root controller, such as in a PCIe interconnection hierarchy. Examples of controller hub 115 include a chipset, a memory controller hub (MCH), a northbridge, an interconnect controller hub (ICH) a southbridge, and a root controller/hub. Often the term chipset refers to two physically separate controller hubs, e.g., a memory controller hub (MCH) coupled to an interconnect controller hub (ICH). Note that current systems often include the MCH integrated with processor 105, while controller 115 is to communicate with I/O devices, in a similar manner as described below. In some embodiments, peer-to-peer routing is optionally supported through root complex 115.

Here, controller hub 115 is coupled to switch/bridge 120 through serial link 119. Input/output modules 117 and 121, which may also be referred to as interfaces/ports 117 and 121, can include/implement a layered protocol stack to provide communication between controller hub 115 and switch 120. In one embodiment, multiple devices are capable of being coupled to switch 120.

Switch/bridge 120 routes packets/messages from device 125 upstream, i.e. up a hierarchy towards a root complex, to controller hub 115 and downstream, i.e. down a hierarchy away from a root controller, from processor 105 or system memory 110 to device 125. Switch 120, in one embodiment, is referred to as a logical assembly of multiple virtual PCI-to-PCI bridge devices. Device 125 includes any internal or external device or component to be coupled to an electronic system, such as an I/O device, a Network Interface Controller (NIC), an add-in card, an audio processor, a network processor, a hard-drive, a storage device, a CD/DVD ROM, a monitor, a printer, a mouse, a keyboard, a router, a portable storage device, a Firewire device, a Universal Serial Bus (USB) device, a scanner, and other input/output devices. Often in the PCIe vernacular, such as device, is referred to as an endpoint. Although not specifically shown, device 125 may include a bridge (e.g., a PCIe to PCI/PCI-X bridge) to support legacy or other versions of devices or interconnect fabrics supported by such devices.

Graphics accelerator 130 can also be coupled to controller hub 115 through serial link 132. In one embodiment, graphics accelerator 130 is coupled to an MCH, which is coupled to an ICH. Switch 120, and accordingly I/O device 125, is then coupled to the ICH. I/O modules 131 and 118 are also to implement a layered protocol stack and associated logic to communicate between graphics accelerator 130 and controller hub 115. Similar to the MCH discussion above, a graphics controller or the graphics accelerator 130 itself may be integrated in processor 105.

Figure 2:
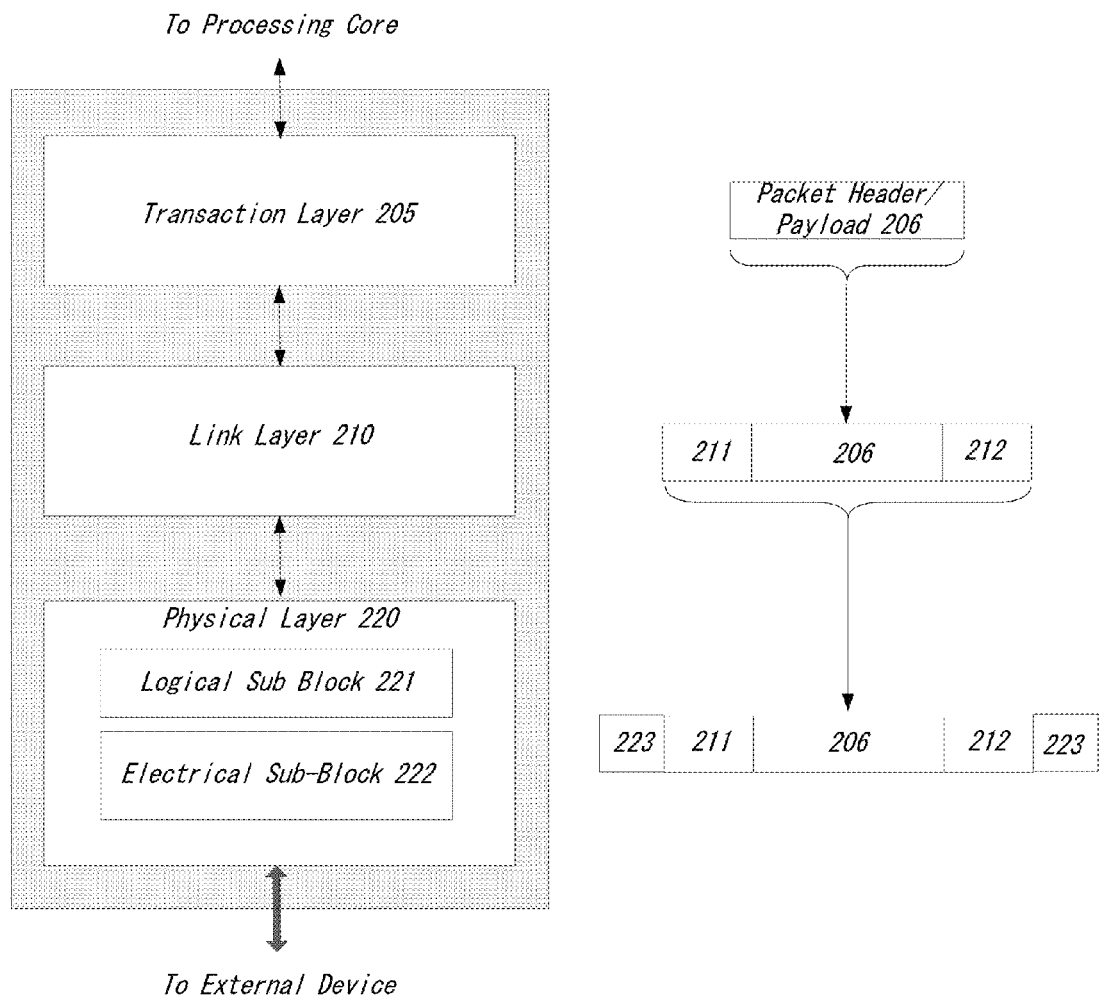
FIG. 2 illustrates a simplified block diagram of a layered protocol stack in accordance with one embodiment.

Turning to FIG. 2 an embodiment of a layered protocol stack is illustrated. Layered protocol stack 200 can includes any form of a layered communication stack, such as a QPI stack, a PCIe stack, a next generation high performance computing interconnect (HPI) stack, or other layered stack. In one embodiment, protocol stack 200 can include transaction layer 205, link layer 210, and physical layer 220. An interface, such as interfaces 117, 118, 121, 122, 126, and 131 in FIG. 1, may be represented as communication protocol stack 200. Representation as a communication protocol stack may also be referred to as a module or interface implementing/including a protocol stack.

Packets can be used to communicate information between components. Packets can be formed in the Transaction Layer 205 and Data Link Layer 210 to carry the information from the transmitting component to the receiving component. As the transmitted packets flow through the other layers, they are extended with additional information used to handle packets at those layers. At the receiving side the reverse process occurs and packets get transformed from their Physical Layer 220 representation to the Data Link Layer 210 representation and finally (for Transaction Layer Packets) to the form that can be processed by the Transaction Layer 205 of the receiving device.

In one embodiment, transaction layer 205 can provide an interface between a device's processing core and the interconnect architecture, such as Data Link Layer 210 and Physical Layer 220. In this regard, a primary responsibility of the transaction layer 205 can include the assembly and disassembly of packets (i.e., transaction layer packets, or TLPs). The translation layer 205 can also manage credit-based flow control for TLPs. In some implementations, split transactions can be utilized, i.e., transactions with request and response separated by time, allowing a link to carry other traffic while the target device gathers data for the response, among other examples.

Credit-based flow control can be used to realize virtual channels and networks utilizing the interconnect fabric. In one example, a device can advertise an initial amount of credits for each of the receive buffers in Transaction Layer 205. An external device at the opposite end of the link, such as controller hub 115 in FIG. 1, can count the number of credits consumed by each TLP. A transaction may be transmitted if the transaction does not exceed a credit limit. Upon receiving a response an amount of credit is restored. One example of an advantage of such a credit scheme is that the latency of credit return does not affect performance, provided that the credit limit is not encountered, among other potential advantages.

In one embodiment, four transaction address spaces can include a configuration address space, a memory address space, an input/output address space, and a message address space. Memory space transactions include one or more of read requests and write requests to transfer data to/from a memory-mapped location. In one embodiment, memory space transactions are capable of using two different address formats, e.g., a short address format, such as a 32-bit address, or a long address format, such as 64-bit address. Configuration space transactions can be used to access configuration space of various devices connected to the interconnect. Transactions to the configuration space can include read requests and write requests. Message space transactions (or, simply messages) can also be defined to support in-band communication between interconnect agents. Therefore, in one example embodiment, transaction layer 205 can assemble packet header/payload 206.

Figure 3:
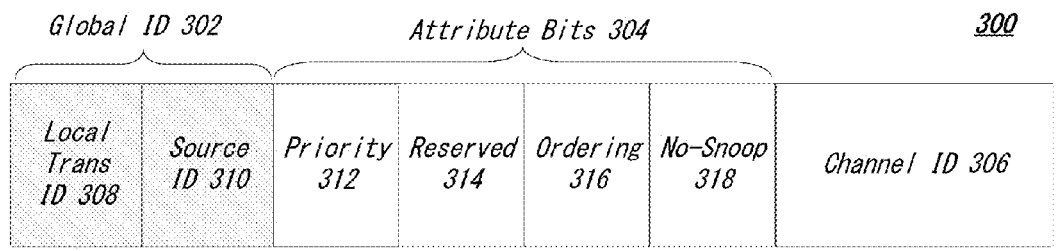
FIG. 3 illustrates an embodiment of a transaction descriptor.

Quickly referring to FIG. 3, an example embodiment of a transaction layer packet descriptor is illustrated. In one embodiment, transaction descriptor 300 can be a mechanism for carrying transaction information. In this regard, transaction descriptor 300 supports identification of transactions in a system. Other potential uses include tracking modifications of default transaction ordering and association of transaction with channels. For instance, transaction descriptor 300 can include global identifier field 302, attributes field 304 and channel identifier field 306. In the illustrated example, global identifier field 302 is depicted comprising local transaction identifier field 308 and source identifier field 310. In one embodiment, global transaction identifier 302 is unique for all outstanding requests.

According to one implementation, local transaction identifier field 308 is a field generated by a requesting agent, and can be unique for all outstanding requests that require a completion for that requesting agent. Furthermore, in this example, source identifier 310 uniquely identifies the requestor agent within an interconnect hierarchy. Accordingly, together with source ID 310, local transaction identifier 308 field provides global identification of a transaction within a hierarchy domain.

Attributes field 304 specifies characteristics and relationships of the transaction. In this regard, attributes field 304 is potentially used to provide additional information that allows modification of the default handling of transactions.

In one embodiment, attributes field 304 includes priority field 312, reserved field 314, ordering field 316, and no-snoop field 318. Here, priority sub-field 312 may be modified by an initiator to assign a priority to the transaction. Reserved attribute field 314 is left reserved for future, or vendor-defined usage. Possible usage models using priority or security attributes may be implemented using the reserved attribute field.

In this example, ordering attribute field 316 is used to supply optional information conveying the type of ordering that may modify default ordering rules. According to one example implementation, an ordering attribute of "0" denotes default ordering rules are to apply, wherein an ordering attribute of "1" denotes relaxed ordering, wherein writes can pass writes in the same direction, and read completions can pass writes in the same direction. Snoop attribute field 318 is utilized to determine if transactions are snooped. As shown, channel ID Field 306 identifies a channel that a transaction is associated with.

Returning to the discussion of FIG. 2, a Link layer 210, also referred to as data link layer 210, can act as an intermediate stage between transaction layer 205 and the physical layer 220. In one embodiment, a responsibility of the data link layer 210 is providing a reliable mechanism for exchanging Transaction Layer Packets (TLPs) between two components on a link. One side of the Data Link Layer 210 accepts TLPs assembled by the Transaction Layer 205, applies packet sequence identifier 211, i.e. an identification number or packet number, calculates and applies an error detection code, i.e. CRC 212, and submits the modified TLPs to the Physical Layer 220 for transmission across a physical to an external device.

In one example, physical layer 220 includes logical sub block 221 and electrical sub-block 222 to physically transmit a packet to an external device. Here, logical sub-block 221 is responsible for the "digital" functions of Physical Layer 221. In this regard, the logical sub-block can include a transmit section to prepare outgoing information for transmission by physical sub-block 222, and a receiver section to identify and prepare received information before passing it to the Link Layer 210.

Physical block 222 includes a transmitter and a receiver. The transmitter is supplied by logical sub-block 221 with symbols, which the transmitter serializes and transmits onto to an external device. The receiver is supplied with serialized symbols from an external device and transforms the received signals into a bit-stream. The bit-stream is de-serialized and supplied to logical sub-block 221. In one example embodiment, an 8b/10b transmission code is employed, where ten-bit symbols are transmitted/received. Here, special symbols are used to frame a packet with frames 223. In addition, in one example, the receiver also provides a symbol clock recovered from the incoming serial stream.

As stated above, although transaction layer 205, link layer 210, and physical layer 220 are discussed in reference to a specific embodiment of a protocol stack (such as a PCIe protocol stack), a layered protocol stack is not so limited. In fact, any layered protocol may be included/implemented and adopt features discussed herein. As an example, a port/interface that is represented as a layered protocol can include: (1) a first layer to assemble packets, i.e. a transaction layer, a second layer to sequence packets, i.e. a link layer; and a third layer to transmit the packets, i.e. a physical layer. As a specific example, a high performance interconnect layered protocol, as described herein, is utilized.

Figure 4:
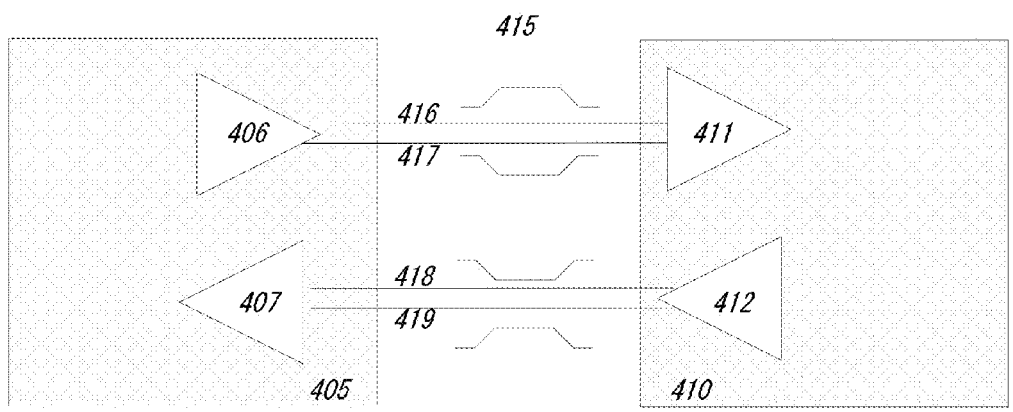
FIG. 4 illustrates an embodiment of a serial point-to-point link.

Referring next to FIG. 4, an example embodiment of a serial point to point fabric is illustrated. A serial point-to-point link can include any transmission path for transmitting serial data. In the embodiment shown, a link can include two, low-voltage, differentially driven signal pairs: a transmit pair 406/411 and a receive pair 412/407. Accordingly, device 405 includes transmission logic 406 to transmit data to device 410 and receiving logic 407 to receive data from device 410. In other words, two transmitting paths, i.e. paths 416 and 417, and two receiving paths, i.e. paths 418 and 419, are included in some implementations of a link.

A transmission path refers to any path for transmitting data, such as a transmission line, a copper line, an optical line, a wireless communication channel, an infrared communication link, or other communication path. A connection between two devices, such as device 405 and device 410, is referred to as a link, such as link 415. A link may support one lane—each lane representing a set of differential signal pairs (one pair for transmission, one pair for reception). To scale bandwidth, a link may aggregate multiple lanes denoted by xN, where N is any supported link width, such as 1, 2, 4, 8, 12, 16, 32, 64, or wider.

A differential pair can refer to two transmission paths, such as lines 416 and 417, to transmit differential signals. As an example, when line 416 toggles from a low voltage level to a high voltage level, i.e. a rising edge, line 417 drives from a high logic level to a low logic level, i.e. a falling edge. Differential signals potentially demonstrate better electrical characteristics, such as better signal integrity, i.e. cross-coupling, voltage overshoot/undershoot, ringing, among other example advantages. This allows for a better timing window, which enables faster transmission frequencies.

In one embodiment, a new High Performance Interconnect (HPI) is provided. HPI can include a next-generation cache-coherent, link-based interconnect. As one example, HPI may be utilized in high performance computing platforms, such as workstations or servers, including in systems where PCIe or another interconnect protocol is typically used to connect processors, accelerators, I/O devices, and the like. However, HPI is not so limited. Instead, HPI may be utilized in any of the systems or platforms described herein. Furthermore, the individual ideas developed may be applied to other interconnects and platforms, such as PCIe, MIPI, QPI, etc.

Figure 5:
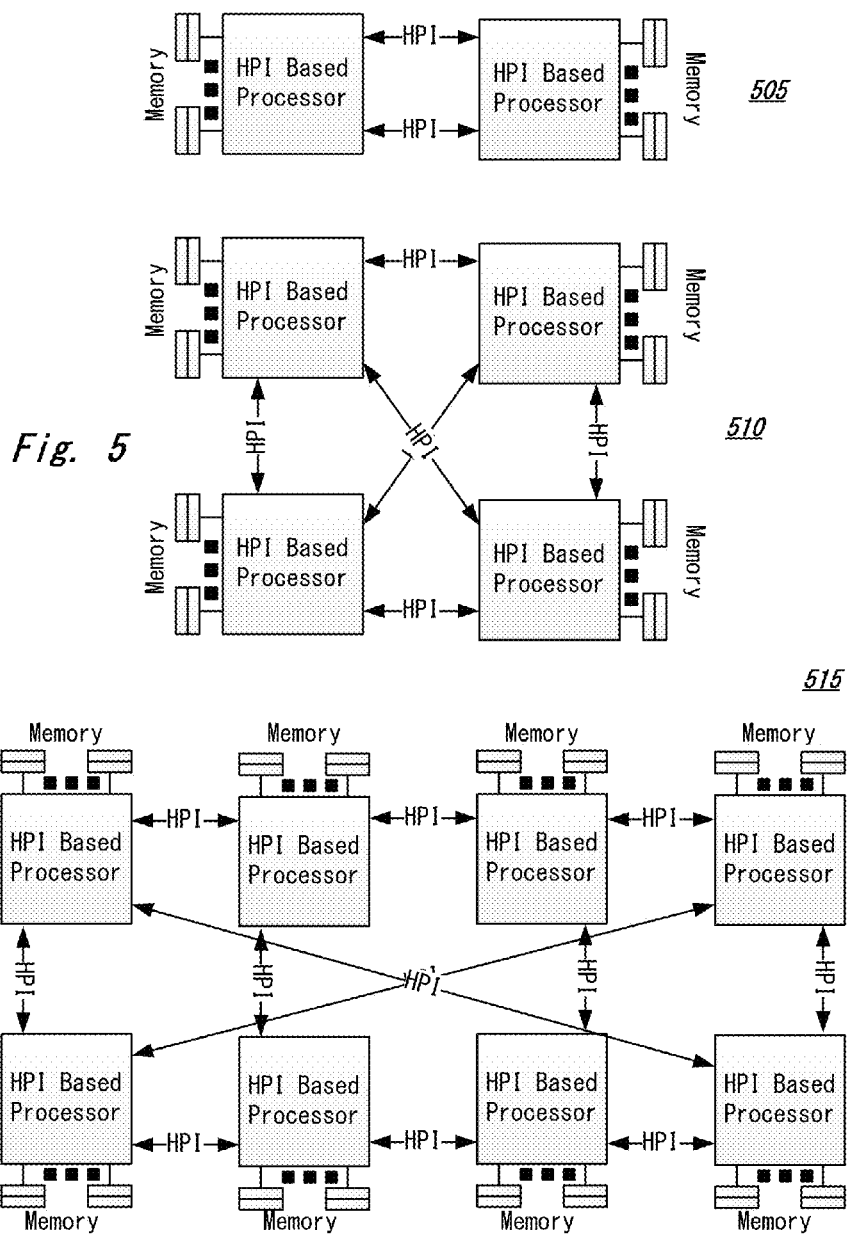
FIG. 5 illustrates embodiments of potential High Performance Interconnect (HPI) system configurations.

To support multiple devices, in one example implementation, HPI can include an Instruction Set Architecture (ISA) agnostic (i.e. HPI is able to be implemented in multiple different devices). In another scenario, HPI may also be utilized to connect high performance I/O devices, not just processors or accelerators. For example, a high performance PCIe device may be coupled to HPI through an appropriate translation bridge (i.e. HPI to PCIe). Moreover, the HPI links may be utilized by many HPI based devices, such as processors, in various ways (e.g. stars, rings, meshes, etc.). FIG. 5 illustrates example implementations of multiple potential multi-socket configurations. A two-socket configuration 505, as depicted, can include two HPI links; however, in other implementations, one HPI link may be utilized. For larger topologies, any configuration may be utilized as long as an identifier (ID) is assignable and there is some form of virtual path, among other additional or substitute features. As shown, in one example, a four socket configuration 510 has an HPI link from each processor to another. But in the eight socket implementation shown in configuration 515, not every socket is directly connected to each other through an HPI link. However, if a virtual path or channel exists between the processors, the configuration is supported. A range of supported processors includes 2-32 in a native domain. Higher numbers of processors may be reached through use of multiple domains or other interconnects between node controllers, among other examples.

Figure 6:
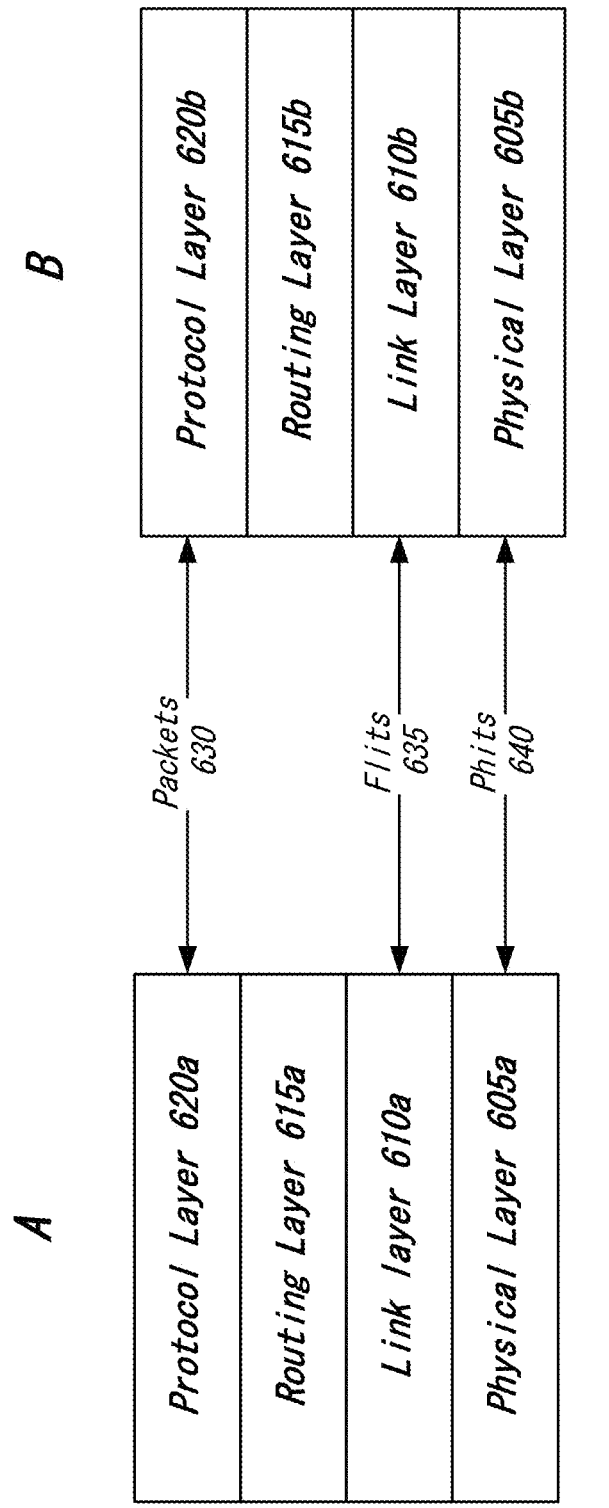
FIG. 6 illustrates an embodiment of a layered protocol stack associated with HPI.

The HPI architecture includes a definition of a layered protocol architecture, including in some examples, protocol layers (coherent, non-coherent, and, optionally, other memory based protocols), a routing layer, a link layer, and a physical layer including associated I/O logic. Furthermore, HPI can further include enhancements related to power managers (such as power control units (PCUs)), design for test and debug (DFT), fault handling, registers, security, among other examples. FIG. 6 illustrates an embodiment of an example HPI layered protocol stack. In some implementations, at least some of the layers illustrated in FIG. 6 may be optional. Each layer deals with its own level of granularity or quantum of information (the protocol layer 605a,b with packets 630, link layer 610a,b with flits 635, and physical layer 605a,b with phits 640). Note that a packet, in some embodiments, may include partial flits, a single flit, or multiple flits based on the implementation.

As a first example, a width of a phit 640 includes a 1 to 1 mapping of link width to bits (e.g. 20 bit link width includes a phit of 20 bits, etc.). Flits may have a greater size, such as 184, 192, or 200 bits. Note that if phit 640 is 20 bits wide and the size of flit 635 is 184 bits then it takes a fractional number of phits 640 to transmit one flit 635 (e.g. 9.2 phits at 20 bits to transmit an 184 bit flit 635 or 9.6 at 20 bits to transmit a 192 bit flit, among other examples). Note that widths of the fundamental link at the physical layer may vary. For example, the number of lanes per direction may include 2, 4, 6, 8, 10, 12, 14, 16, 18, 20, 22, 24, etc. In one embodiment, link layer 610a,b is capable of embedding multiple pieces of different transactions in a single flit, and one or multiple headers (e.g. 1, 2, 3, 4) may be embedded within the flit. In one example. HPI splits the headers into corresponding slots to enable multiple messages in the flit destined for different nodes.

Physical layer 605a,b, in one embodiment, can be responsible for the fast transfer of information on the physical medium (electrical or optical etc.). The physical link can be point-to-point between two Link layer entities, such as layer 605a and 605b. The Link layer 610a,b can abstract the Physical layer 605a,b from the upper layers and provides the capability to reliably transfer data (as well as requests) and manage flow control between two directly connected entities. The Link Layer can also be responsible for virtualizing the physical channel into multiple virtual channels and message classes. The Protocol layer 620a,b relies on the Link layer 610a,b to map protocol messages into the appropriate message classes and virtual channels before handing them to the Physical layer 605a,b for transfer across the physical links. Link layer 610a,b may support multiple messages, such as a request, snoop, response, writeback, non-coherent data, among other examples.

The Physical layer 605a,b (or PHY) of HPI can be implemented above the electrical layer (i.e. electrical conductors connecting two components) and below the link layer 610a,b, as illustrated in FIG. 6. The Physical layer and corresponding logic can reside on each agent and connects the link layers on two agents (A and B) separated from each other (e.g. on devices on either side of a link). The local and remote electrical layers are connected by physical media (e.g. wires, conductors, optical, etc.). The Physical layer 605a,b, in one embodiment, has two major phases, initialization and operation. During initialization, the connection is opaque to the link layer and signaling may involve a combination of timed states and handshake events. During operation, the connection is transparent to the link layer and signaling is at a speed, with all lanes operating together as a single link. During the operation phase, the Physical layer transports flits from agent A to agent B and from agent B to agent A. The connection is also referred to as a link and abstracts some physical aspects including media, width and speed from the link layers while exchanging flits and control/status of current configuration (e.g. width) with the link layer. The initialization phase includes minor phases e.g. Polling, Configuration. The operation phase also includes minor phases (e.g. link power management states).

In one embodiment, Link layer 610a,b can be implemented so as to provide reliable data transfer between two protocol or routing entities. The Link layer can abstract Physical layer 605a,b from the Protocol layer 620a,b, and can be responsible for the flow control between two protocol agents (A, B), and provide virtual channel services to the Protocol layer (Message Classes) and Routing layer (Virtual Networks). The interface between the Protocol layer 620a,b and the Link Layer 610a,b can typically be at the packet level. In one embodiment, the smallest transfer unit at the Link Layer is referred to as a flit which a specified number of bits, such as 192 bits or some other denomination. The Link Layer 610a,b relies on the Physical layer 605a,b to frame the Physical layer's 605a,b unit of transfer (phit) into the Link Layer's 610a,b unit of transfer (flit). In addition, the Link Layer 610a,b may be logically broken into two parts, a sender and a receiver. A sender/receiver pair on one entity may be connected to a receiver/sender pair on another entity. Flow Control is often performed on both a flit and a packet basis. Error detection and correction is also potentially performed on a flit level basis.

In one embodiment, Routing layer 615a,b can provide a flexible and distributed method to route HPI transactions from a source to a destination. The scheme is flexible since routing algorithms for multiple topologies may be specified through programmable routing tables at each router (the programming in one embodiment is performed by firmware, software, or a combination thereof). The routing functionality may be distributed; the routing may be done through a series of routing steps, with each routing step being defined through a lookup of a table at either the source, intermediate, or destination routers. The lookup at a source may be used to inject a HPI packet into the HPI fabric. The lookup at an intermediate router may be used to route an HPI packet from an input port to an output port. The lookup at a destination port may be used to target the destination HPI protocol agent. Note that the Routing layer, in some implementations, can be thin since the routing tables, and, hence the routing algorithms, are not specifically defined by specification. This allows for flexibility and a variety of usage models, including flexible platform architectural topologies to be defined by the system implementation. The Routing layer 615a,b relies on the Link layer 610a,b for providing the use of up to three (or more) virtual networks (VNs)—in one example, two deadlock-free VNs, VN0 and VN0 with several message classes defined in each virtual network. A shared adaptive virtual network (VNA) may be defined in the Link layer, but this adaptive network may not be exposed directly in routing concepts, since each message class and virtual network may have dedicated resources and guaranteed forward progress, among other features and examples.

In one embodiment, HPI can include a Coherence Protocol layer 620a,b to support agents caching lines of data from memory. An agent wishing to cache memory data may use the coherence protocol to read the line of data to load into its cache. An agent wishing to modify a line of data in its cache may use the coherence protocol to acquire ownership of the line before modifying the data. After modifying a line, an agent may follow protocol requirements of keeping it in its cache until it either writes the line back to memory or includes the line in a response to an external request. Lastly, an agent may fulfill external requests to invalidate a line in its cache. The protocol ensures coherency of the data by dictating the rules all caching agents may follow. It also provides the means for agents without caches to coherently read and write memory data.

Two conditions may be enforced to support transactions utilizing the HPI Coherence Protocol. First, the protocol can maintain data consistency, as an example, on a per-address basis, among data in agents' caches and between those data and the data in memory. Informally, data consistency may refer to each valid line of data in an agent's cache representing a most up-to-date value of the data and data transmitted in a coherence protocol packet can represent the most up-to-date value of the data at the time it was sent. When no valid copy of the data exists in caches or in transmission, the protocol may ensure the most up-to-date value of the data resides in memory. Second, the protocol can provide well-defined commitment points for requests. Commitment points for reads may indicate when the data is usable; and for writes they may indicate when the written data is globally observable and will be loaded by subsequent reads. The protocol may support these commitment points for both cacheable and uncacheable (UC) requests in the coherent memory space.

The HPI Coherence Protocol also may ensure the forward progress of coherence requests made by an agent to an address in the coherent memory space. Certainly, transactions may eventually be satisfied and retired for proper system operation. The HPI Coherence Protocol, in some embodiments, may have no notion of retry for resolving resource allocation conflicts. Thus, the protocol itself may be defined to contain no circular resource dependencies, and implementations may take care in their designs not to introduce dependencies that can result in deadlocks. Additionally, the protocol may indicate where designs are able to provide fair access to protocol resources.

Logically, the HPI Coherence Protocol, in one embodiment, can include three items: coherence (or caching) agents, home agents, and the HPI interconnect fabric connecting the agents. Coherence agents and home agents can work together to achieve data consistency by exchanging messages over the interconnect. The link layer 610a,b and its related description can provide the details of the interconnect fabric including how it adheres to the coherence protocol's requirements, discussed herein. (It may be noted that the division into coherence agents and home agents is for clarity. A design may contain multiple agents of both types within a socket or even combine agents behaviors into a single design unit, among other examples.)

In one embodiment, home agents can be configured to guard physical memory. Each home agent can be responsible for a region of the coherent memory space. Regions may be non-overlapping, in that a single address is guarded by one home agent, and together the home agent regions in a system cover the coherent memory space. For instance, each address can be guarded by at least one home agent. Therefore, in one embodiment, each address in a HPI system's coherent memory space can map to exactly one home agent.

Home agents in the HPI Coherence Protocol, in one embodiment, can be responsible for servicing requests to the coherent memory space. For read (Rd) requests, home agents may generate snoops (Snp), process their responses, send a data response, and send a completion response. For invalidation (Inv) requests, home agents may generate necessary snoops, process their responses, and send a completion response. For write requests, home agents may commit the data to memory and send a completion response.

Home agents may provide snoops in the HPI Coherence Protocol and process snoop responses from coherence agents. Home agents can also process forward requests, which are a special snoop response, from coherence agents for conflict resolution. When a home agent receives a forward request, it may send a forward response to the coherence agent that generated the forward request (i.e., the agent that detected a conflicting snoop request). Coherence agents can use the ordering of these forward responses and completion responses from the home agent to resolve conflicts.

A coherence agent may issue supported coherence protocol requests. Requests may be issued to an address in the coherent memory space. Data received for read requests (Rd) except RdCur may be consistent. Data for RdCur requests may have been consistent when the data packet was generated (although it may have become out of date during delivery). Table 1 shows an exemplary, non-exhaustive list of potential supported requests:

TABLE 1

| Name | Semantics | Cache State |
|---|---|---|
| RdCode | Request a cache line in F or S state. | F or S |
| RdData | Request a cache line in E, F, or S state. | F or S |
| RdMigr | Request a cache line in M, E, F, or S state. | M and (F or S) |
| RdInv | Request a cache line in E state. If line was previously cached in M state, the line will be written to memory before E data is delivered. | E |
| RdInvOwn | Request a cache line in M or E state. | M |
| RdCur | Request an uncacheable snapshot of a cache line. | |
| InvItoE | Request exclusive ownership of a cache line without receiving data. | M or E |
| InvItoM | Request exclusive ownership of a cache line without receiving data and with the intent of performing a writeback soon afterward. | M or E |
| InvXtoI | Flush a cache line from all caches. Requesting agent is to invalidate the line in its cache before issuing this request. | |
| WbMtoI | Write a cache line in M state back to memory and invalidate the line in the cache. | M |
| WbMtoS | Write a cache line in M state back to memory and transition line to S state. | M and S |
| WbMtoE | Write a cache line in M state back to memory and transition line to E state. | M and E |
| WbMtoIPtl | Write a cache line in M state back to memory, according to a byte-enable mask, and transition line to I state. | M |
| WbMtoEPtl | Write a cache line in M state back to memory, according to a byte-enable mask, transition line to E state, and clear the line's mask in the cache. | M and E |
| EvctCln | Notification to home agent that a cache line in E state was invalidated in the cache. | E |
| WbPushMtoI | Send a line in M state to home agent and invalidate the line in the cache; home agent may either write the line back to memory or send it to a local cache agent with M state. | M |
| WbFlush | Request that home flush writes to implementation-specific addresses in its memory hierarchy. No data is sent with the request. | |

HPI can support a Coherency protocol making use of principles of the MESI protocol. Each cache line can be marked with one or more supported states (e.g., coded in the cache line). A "M" or "Modified" state can indicate that the cache line value has been modified from that value which is in main memory. A line in the M-state is only present in the particular and the corresponding cache agent can be required to write the modified data back to memory at some time in the future, for instance, before permitting any other read of the (no longer valid) maing memory state. A writeback can transition the line from the M-state to the E-state. The "E" or "Exclusive" state can indicate that the cache line is only present in the current cache but that its value matches that in main memory. The cache line in E-state can transition to the S-state at any time in response to a read request or may be changed to the M-state by writing to the line. The "S" or "Shared" state can indicates that the cache line may be stored in other caches of the machine and has a value that matches that of the main memory. The line may be discarded (changed to the I-state) at any time. The "I" or "Invalid" state can indicate that a cache line is invalid or unused. Other state can also supported in HPI, such as an "F" or "Forward" shared state that indicates that the particular shared line value is to be forwarded to other caches that are to also share the line, among other examples.

Table 2 include exemplary information that can be included in some Coherence protocol messages, including snoop, read, and write requests, among other examples:

TABLE 2

| Field | Usage |
|---|---|
| cmd | Message command (or name or opcode). |
| addr | Address of a coherent cache line. |
| destNID | Node ID (NID) of destination (home or coherence) agent. |
| reqNID | NID of requesting coherence agent. |
| peerNID | NID of coherence agent that sent the (forward request) message. |
| reqTID | ID of the resource allocated by the requesting agent for the transaction, also known as RTID (or requesting transaction identifier). |
| homeTID | ID of the resource allocated by the home agent to process the request, also known as HTID (or home transaction identifier). |
| data | A cache line of data. |
| mask | Byte mask to qualify the data. |

Snoop messages may be generated by home agents and directed toward coherence agents. A snoop (SNP) virtual channel can be used for snoops and, in one embodiment, are the only messages that use the SNP virtual channel. Snoops can include the requesting agent's NID and the RTID it allocated for the request in case the snoop results in data being sent directly to the requesting agent. Snoops, in one embodiment, can also include the HTID allocated by the home agent to process the request. The coherence agent processing the snoop may include the HTID in the snoop response it sends back to the home agent. Snoops may, in some instance, not include the home agent's NID because it may be derived from the included address, which the targeted coherence agent does when sending its response. Fanout snoops (those with "SnpF" prefix) may not include a destination NID because the Routing Layer is responsible for generating the appropriate snoop messages to all peers in the fanout region. An exemplary list of snoop channel messages is listed Table 3:

HPI may also support non snoop requests that they may issue to an address, such as those implemented as non-coherent requests. Examples of such requests can include a non-snoop read to request a read-only line form memory, a non-snoop write to write a line to memory, and a write a line to memory according to a mask, among other potential examples.

In one example, four general types of response messages can be defined in the HPI Coherence Protocol: data, completion, snoop, and forward. Certain data messages can carry an additional completion indication and certain snoop responses can carry data. Response messages may use the RSP virtual channel, and the communication fabric may maintain proper message delivery ordering among ordered completion responses and forward responses.

TABLE 3

| Command | Semantics | Fields |
| --- | --- | --- |
| SnpCode | Snoop to get data in F or S state. | cmd, |
| SnpData | Snoop to get data in E, F, or S state. | addr, |
| SnpMigr | Snoop to get data in M, E, F, or S state. | destNID, |
| SnpInv | Snoop to invalidate the peer's cache, flushing any M copy to memory. | reqNID, reqTID, |
| SnpInvOwn | Snoop to get data in M or E state. | homeTID |
| SnpCur | Snoop to get an uncacheable snapshot of a cache line. | |
| SnpFCode | Snoop to get data in F or S state; Routing layer to handle distribution to all fanout peers | cmd, addr, |
| SnpFData | Snoop to get data in E, F, or S state; Routing layer to handle distribution to all fanout peers | reqNID, reqTID, |
| SnpFMigr | Snoop to get data in M, E, F, or S state; Routing layer to handle distribution to all fanout peers | homeTID |
| SnpFInvOwn | Snoop to get data in M or E state: Routing layer to handle distribution to all fanout peers. | |
| SnpFInv | Snoop to invalidate the peer's cache, flushing any M copy to memory; Routing layer to handle distribution to all fanout peers. | |
| SnpCur | Snoop to get an uncacheable snapshot of a, cache line: Routing layer to handle distribution to all fanout peers. | |

Table 4 includes a listing of at least some potential response messages supported by an example HPI Coherence Protocol:

TABLE 4

| Name | Semantics | Fields |
| --- | --- | --- |
| Data_M | Data is M state. | cmd, |
| Data_E | Data is E state. | destNID, |
| Data_F | Data is F state. | reqTID, |
| Data_SI | Depending upon request, data in S state or uncacheable "snapshot" data. | data |
| Data_M | Data is M state with an ordered completion response. | |
| Data_E | Data is E state with an ordered completion response. | |
| Data_F | Data is F state with an ordered completion response. | |
| Data_SI | Depending upon request, data in S state or uncacheable "snapshot" data, with an ordered completion response. | |
| CmpU | Completion message with no ordering requirements. | cmd, |
| CmpO | Completion message to be ordered with forward responses. | destNID, reqTID |
| RspI | Cache is in I state. | cmd, |
| RspS | Cache is in S state. | destNID, |
| RspFwd | Copy of cache line was sent to requesting agent, cache state did not change. | homeTID |
| RspFwdI | Copy of cache line was sent to requesting agent, cache transitions to I state. | |
| RspFwdS | Copy of cache line was sent to requesting agent, cache transitions to S state. | |
| RspIWb | Modified line is being implicitly written back to memory, cache was transitioned to I state. | cmd, destNID, |
| RspSWb | Modified line is being implicitly written back to memory, cache was transitioned to S state. | homeTID, data |

TABLE 4-continued

| Name | Semantics | Fields |
| --- | --- | --- |
| RspFwdIWb | Modified line is being implicitly written back to memory, copy of cache line was sent to requesting agent, cache was transitioned to I state. | |
| RspFwdSWb | Modified line is being implicitly written back to memory, copy of cache line was sent to requesting agent, cache was transitioned to S state. | |
| RspCnflt | Peer has an outstanding request to same address, is requesting an ordered forward response, and has allocated a resource for the forward. | cmd, destNID, homeTID, peerNID |

In one example, data responses can target a requesting coherence agent. A home agent may send any of the data responses. A coherence agent may send only data responses not containing an ordered completion indication. Additionally, coherence agents may be limited to sending data responses only as a result of processing a snoop request. Combined data and completion responses may always be of the ordered-completion type and can be kept ordered with forward responses by the communication fabric.

The HPI Coherence Protocol can uses the general unordered completion message and a coherence-specific ordered completion message. A home agent may send completion responses to coherent requests and completion responses can be typically destined for a coherence agent. The ordered completion response can be kept ordered with forward responses by the communication fabric.

Snoop responses may be sent by coherence agents, specifically in response to processing a snoop request, and target the home agent handling the snoop request. The destNID is usually a home agent (determined from the address in the snoop request) and the included TID is for the home agent's resource allocated to process the request. Snoop responses with "Wb" in the command are for implicit writebacks of modified cache lines, and they carry the cache line data. (Implicit writebacks can include those a coherence agent makes due to another agent's request, whereas the other requests are made explicitly by the coherence agent using its request resources.)

Coherence agents can generate a forward request when a snoop request conflicts with an outstanding request. Forward requests target the home agent that generated the snoop, which is determined from the address in the snoop request. Thus, the destNID is a home agent. The forward request can also include the TID for the home agent's resource allocated to process the original request and the NID of the coherence agent generating the forward request The HPI Coherence Protocol can support a single forward response, FwdCnfltO. Home agents can send a forward response for every forward request received and to the coherence agent in the forward request's peerNID field. Forward responses carry the cache line address so the coherence agent can match the message to the forward resource it allocated. Forward response message can carry the requesting agent's NID but, in some cases, not the requesting agent's TID. If a coherence agent wants to support cache-to-cache transfers for forward responses, it can save the requesting agent's TID when processing the snoop and send a forward request. To support conflict resolution, the communication fabric may maintain ordering between the forward response and all ordered completions sent before it to the same destination coherence agent.

In some systems, home agent resources are pre-allocated in that "RTIDs" represent resources in the home agents and the caching agents allocate RTIDs from system-configured pools when generating new coherence requests. Such schemes can limit the number of active requests any particular caching agent can have to a home agent to the number of RTIDs it was given by the system, effectively slicing up home resources statically among caching agents. Such schemes can result inefficient allocation of resources and properly sizing a home agent to support request throughput can become impractical for large systems, among other potential issues. For instance, such schemes can force RTID pool management upon the caching agents. Additionally, in some systems, a caching agent may not reuse the RTID until the home agent has completely processed the transaction. Waiting until a home agent completes all processing, however, can unnecessarily throttle caching agents. Additionally, certain flows in the protocol can involve caching agents holding onto RTIDs beyond the home agent release notification, further throttling their performance, among other issues.

In one implementation, home agents can be allowed to allocate their resources as requests arrive from cache agents. In such instances, home agent resource management can be kept separate from coherence agent logic. In some implementations, home resource management and coherence agent logic can be at least partially intermingled. In some instances, coherence agents can have more outstanding requests to a home agent than the home agent can simultaneously handle. For instance, HPI can allow requests to queue up in the communication fabric. Further, to avoid deadlocks caused by the home agent blocking incoming requests until resources become available, the HPI Coherence protocol can be configured to ensure that other messages can make progress around blocked requests to ensure that active transactions reach completion.

In one example, resource management can be supported by allowing an agent receiving a request to allocate resources to process it, the agent sending the request allocating respective resources for all responses to the request The HTID can represent the resource that a home agent allocates for a given request included in some protocol messages. The HTID (along with RNID/RTID) in snoop requests and forward responses can be used to support responses to a home agent as well as data forwarding to a requesting agent, among other examples. Further, HPI can support the ability of an agent to send an ordered complete (CmpO) early, that is, before the home agent is finished processing the request, when it is determined to be safe for a requesting agent to reuse its RTID resource. General handling of snoops with similar RNID/RTID can also be defined by the protocol.

In one illustrative example, when a particular request's tracker state is busy, a directory state can be used to determine when the home agent may send a response. For instance, an Invalid directory state can allow a response to be sent, except for RdCur requests which indicates there are no outstanding snoop responses. An Unknown directory state can dictate that all peer agents have been snooped and all their responses gathered before a response can be sent. The Exclusive directory state can dictate that the owner be snooped and all responses gathered before a response is sent, or if the requesting agent is the owner then a response may immediately be sent. The Shared directory state can specify that an invalidating request (e.g., RdInv* or Inv*) has snooped all peer agents and gathered all snoop responses. When a given request's tracker state is writeback buffered (WbBuffered), the home agent may send a data response. When the request's tracker state is DataSent (indicating the home agent has already sent a data response) or DataXfrd (indicating a peer transferred a copy of the line), the home agent may send the completion response.

In instances such as those described above, a home agent may send data and completion responses before all snoop responses have been gathered. The HPI interface allows these "early" responses. When sending early data and completions, the home agent may gather all outstanding snoop responses before releasing the resource it allocated for the request. The home agent can also continue blocking further standard requests to the same address until all snoop responses have been gathered, then releasing the resource. A home agent sending a response message from a Busy or WbBuffered state can use a sub-action table (e.g., included in a set of protocol tables embodying the formal specification of the HPI Coherence protocol) for which message to send and use a sub action table for how to update the directory state, among other examples. In some cases, an early completion can be performed without pre-allocation by a home node.

In one embodiment, HPI Coherence protocol can omit the use of either or both pre-allocated home resources and ordered request channels. In such implementations, certain messages on the HPI RSP communication channel can be ordered. For instance, specifically "ordered completion" and "forward response" messages, can be provided, that can be sent from the home agent to the coherence agent. Home agents can send an ordered completion (CmpO or Data_*_CmpO) for all coherent read and invalidation requests (as well as other requests, such as a NonSnpRd requests, that are not involved in cache-coherence conflicts).

Home agents can send forward responses (FwdCnfltO) to coherence agents that send forward requests (RspCnflt) to indicate a conflict. A coherence agent can generate a forward request whenever it has an outstanding read or invalidation request and detects an incoming snoop request to the same cache line as the request. When the coherence agent receives the forward response, it checks the current state of the outstanding request to determine how to process the original snoop. The home agent can sent the forward response to be ordered with a complete (e.g., CmpO or Data_*_CmpO). The coherence agent can utilize information included in the snoop to aid the coherence agent in processing a forward response. For instance, a forward response may not include any "type" information and no RTID. The nature of the forward response can be derived from information obtained from the preceding snoop(s). Further, a coherence agent may block outstanding snoop requests when all of its "forward resources" are waiting for forward responses. In some implementations, each coherence agent can be designed to have at least one forward resource.

In some implementations, communication fabric requirements can be upon the Routing Layer. In one embodiment, the HPI Coherence protocol has one communication fabric requirement that is specific to the Routing Layer. The coherence protocol can depend upon the routing layer to convert a fanout snoop (SnpF* opcodes—Snoop (SNP) Channel Messages") into the appropriate snoops for all of the request's peers in the fanout set of Coherence Agents. The fanout set is a configuration parameter of the Routing Layer that is shared by the Protocol Layer. In this coherence protocol specification it is described as a Home Agent configuration parameter.

In some implementations above, the HPI Coherence Protocol can utilizes four of the virtual channels: REQ, WB, SNP, and RSP. The virtual channels can be used to unwind dependency cycles and avoid deadlock. In one embodiment, every message can be delivered without duplication on all virtual channels and an ordering requirement upon the RSP virtual channel.

In some implementations, the communication fabric can be configured to preserve an ordering among certain completion messages and the FwdCnfltO message. The completion messages are the CmpO message and any data message with CmpO attached (Data_*_CmpO). Together, all of these messages are the "ordered completion responses." The conceptual requirement between ordered completion responses and the FwdCnfltO message is that a FwdCnfltO does not "pass" an ordered completion. More specifically, if a home agent sends an ordered completion response followed by a FwdCnfltO message and both messages are destined for the same coherence agent, then the communication fabric delivers the ordered completion response before the FwdCnfltO, among other potential examples.

It should be appreciated that while some examples of the protocol flow are disclosed herein, the described examples are merely intended to give an intuitive feel for the protocol and do not necessarily cover all possible scenarios and behaviors the protocol may exhibit.

A conflict may occur when requests to the same cache-line address from more than one coherence agent occur around the same time. As a specific example, a conflict can occur when a snoop for a coherence agent's standard request arrives at a peer coherence agent with an outstanding request to the same address. Because each snoop may end up in a conflict, a single request can have multiple conflicts. Resolving conflicts may be a coordinated effort among the home agent, the coherence agents, and the communication fabric. However, the primary responsibility lies with the coherence agents detecting conflicting snoops.

In one embodiment, home agents, coherence agents, and communication fabric can be configured to assist in successfully resolving conflicts. For example, home agents may have outstanding snoops for only one request per address at a time, such that, for a given address, a home agent may have outstanding snoops for only one request. This can serve to exclude the possibility of race conditions involving two requests conflicting with each other. It can also ensure that a coherence agent will not see another snoop to the same address after it has detected a conflict but not yet resolved it.

In another example, when a coherence agent processes a snoop with an address matching an active standard request, it can allocates a forward resource and sends a forward request to the home agent. A coherence agent with an outstanding standard request that receives a snoop to the same address can responds with a RspCnflt snoop response. This response can be a forward request to the home agent. Because the message is a request, before sending it the coherence agent can allocate a resource to handle the response that the home agent will send. (The coherence protocol allows blocking conflicting snoops when the coherence agent has run out of forward resources, in some instances.) The coherence agent may store information about the conflicting snoop to use when processing the forward response. After detecting a conflict and until processing the forward response, a coherence agent may be guaranteed to not see another snoop to the same address.

In some examples, when a home agent receives a forward request, it does not record the snoop response. Instead, the home agent can send a forward response to the conflicting coherence agent. A forward request (RspCnflt), in one example, looks like a snoop response but the home agent does not treat it as one. It does not record the message as a snoop response, but instead sends a forward response. Specifically, for every forward request (RspCnflt) a home agent receives, it sends a forward response (FwdCnfltO) to the requesting coherence agent.

The HPI Communication Fabric orders forward responses and ordered completions between the home agent and the targeted coherence agent. The fabric can thereby serve to differentiate an early conflict from a late conflict at the conflicting coherence agent. From a system-level perspective, an early conflict occurs when a snoop encounters a request that the home agent has not yet processed, and a late conflict occurs when a snoop encounters a request that the home agent has already processed. From a home agent's perspective, an early conflict is when a snoop for the currently active request encounters a request that the home agent has not yet received or started processing, and a late conflict is when the snoop encounters a request it has already processed. In other words, a late conflict is with a request to which the home agent has already sent a completion response. Thus, when a home agent receives a forward request for a late conflict, it will have already sent the completion response to the conflicting agent's outstanding request. By ordering the forward responses and ordered completion responses from home agent to the coherence agent, the coherence agent can determine whether the conflict was early or late by the processing state of its conflicting request.

When a coherence agent receives a forward response, it uses the state of its conflicting request to determine whether the conflict was early or late and when to process the original snoop. Because of the communication fabric's ordering requirement, the state of the conflicting request indicates whether the conflict was early or late. If the request state indicates the completion has been received then it was a late conflict, otherwise it was an early conflict. Alternatively, if the request state indicates the request is still waiting for its response(s) then it was an early conflict, otherwise it was a late conflict. The type of conflict determines when to process the snoop: From a coherence agent's perspective, an early conflict means the snoop is for a request being processed before the agent's conflicting request, and a late conflict means the snoop is for a request being processed after the agent's conflicting request. Given that ordering, for an early conflict, the coherence agent immediately processes the original snoop; and for a late conflict, the coherence agent waits until the conflicting request has received its data (for reads) and its processor has had an opportunity to act upon the finished request before processing the snoop. When the conflicting snoop is processed, the coherence agent will generate a snoop response for the home agent to finally record.

All conflicts with writeback requests can be late conflicts. A late conflict from the coherence agent's perspective is when the agent's request is processed before the snoop's request. By this definition all conflicts with writeback requests can be treated as late conflicts because the writeback is processed first. Otherwise, data consistency and coherency could be violated if the home agent were to process the request before the writeback commits to memory. Because all conflicts with writebacks are deemed late conflicts, coherence agents can be configured to block conflicting snoops until an outstanding writeback request completes. Further, writebacks can also block the processing of forwards. Blocking forwards by an active writeback can also be implemented as a protocol requirement for supporting uncacheable stores, among other examples.

When a coherence agent receives a request to snoop its cache, it can first check if the coherence protocol will allow it, and then it may process the snoop and generate a response. One or more state tables can be defined within a set of state tables that defines the protocol specification. One or more state table can specify when a coherence agent may process a snoop and whether it will snoop the cache or instead generate a conflict forward request. In one example, there are two conditions under which a coherence agent processes a snoop. The first condition is when the coherence agent has a REQ request (Rd* or Inv*) to the snoop address and it has an available forward resource. In this case, the coherence agent must generate a forward request (RspCnflt). The second condition is when the coherence agent does not have a REQ, Wb*, or EvctCln request to the snoop address. A state table can define how a coherence agent is to process the snoop in accordance with such respective conditions. In one example, under other conditions, the coherence agent can block the snoop until either a forward resource becomes available (first condition) or the blocking Wb* or EvctCln receives its CmpU response (second condition). Note that NonSnp* requests may not affect snoop processing and a coherence agent can disregard NonSnp* entries when determining how to process or block a snoop.

When generating a forward request, a coherence agent can reserve a resource for the forward response. The HPI Coherence protocol, in one example, may not require a minimum number of forward response resources (beyond having at least one) and can allow a coherence agent to block snoops when it has no forward response resources available.

How a coherence agent processes a snoop in its cache can depend upon the snoop type and current cache state. For a given snoop type and cache state, however, there may be many allowed responses. For example, a coherence agent with a full modified line that receives a non-conflicting SnpMigr (or is processing a forward response after a SnpMigr) may do any of the following: Downgrade to S, send implicit writeback to Home and Data_F to requestor; Downgrade to S, send implicit writeback to Home; Downgrade to I, send Data_M to requestor; Downgrade to I, send implicit writeback to Home and Data_E to requestor, Downgrade to I, send implicit writeback to Home; among potentially other examples.

The HPI Coherence protocol allows a coherence agent to store modified lines with partial masks in its cache. However, all rows in for M copies can require a Full or Empty mask. The HPI Coherence protocol, in one example, may restrict implicit writeback of partial lines. A coherence agent wishing to evict a partial M line due to a snoop request (or forward response) can first initiate an explicit writeback and block the snoop (or forward) until the explicit writeback is completed.

Saving information for forward responses: The HPI Coherence Protocol, in one embodiment, allows a coherence agent to store forward response information separate from the outgoing request buffer (ORB). Separating the information allows the ORB to release ORB resources and RTID when all responses are gathered, regardless of the entry being involved in a conflict. State tables can be utilized to specify what information to store for forward responses and under what conditions.

Forward responses in the HPI Coherence protocol can contain the address, the requesting agent's NID, and the home TID. It does not contain the original snoop type or the RTID. A coherence agent may store the forward type and the RTID if it wishes to use them with the forward response, and it may use the address to match the incoming forward response with the proper forward entry (and to generate the home NID). Storing the forward type may be optional. If no type is stored, the coherence agent can treat a forward response as having FwdInv type. Likewise, storing the RTID can be optional and may only occur when the coherence agent is to support cache-to-cache transfers when processing forward responses.

As noted above, coherence agents can generate a forward request when a snoop request conflicts with an outstanding request. Forward requests target the home agent that generated the snoop, which can be determined from the address in the snoop request. Thus, the destNID can identify a home agent. The forward request can also include the TID for the home agent's resource allocated to process the original request and the NID of the coherence agent generating the forward request.

In one embodiment, a coherence agent can block forwards for writeback requests to maintain data consistency. Coherence agents can also use a writeback request to commit uncacheable (UC) data before processing a forward and can allow the coherence agent to writeback partial cache lines instead of protocol supporting a partial implicit writeback for forwards. Indeed, in one embodiment, a coherence agent can be allowed to store modified lines with partial masks in its cache (although M copies are to include a Full or Empty mask).

In one example, early conflicts may be resolved by a forward response encountering an outstanding standard request before it has received any response. A corresponding protocol state table can specify, in one example, that a forward response can be processed as long as the standard request entry is still in ReqSent state. Late conflicts can be resolved by a forward response arriving after the outstanding request has received its completion response. When this occurs either the request will have finished (already received its data or was an Inv* request) or the entry is in its RcvdCmp state. If the request is still waiting for its data, then the coherence agent must block the forward until the data is received (and used). If the conflicting Rd* or Inv* request has finished, then the forward response may be processed as long as the coherence agent has not initiated an explicit writeback of the cache line. It can be permissible for a coherence agent to initiate an explicit writeback while it has a forward response (or snoop request) to the same address, thus allowing partial lines (e.g. Snoop Requests to Partially Modified Lines") or uncacheable stores to be properly committed to memory.

Figure 7:
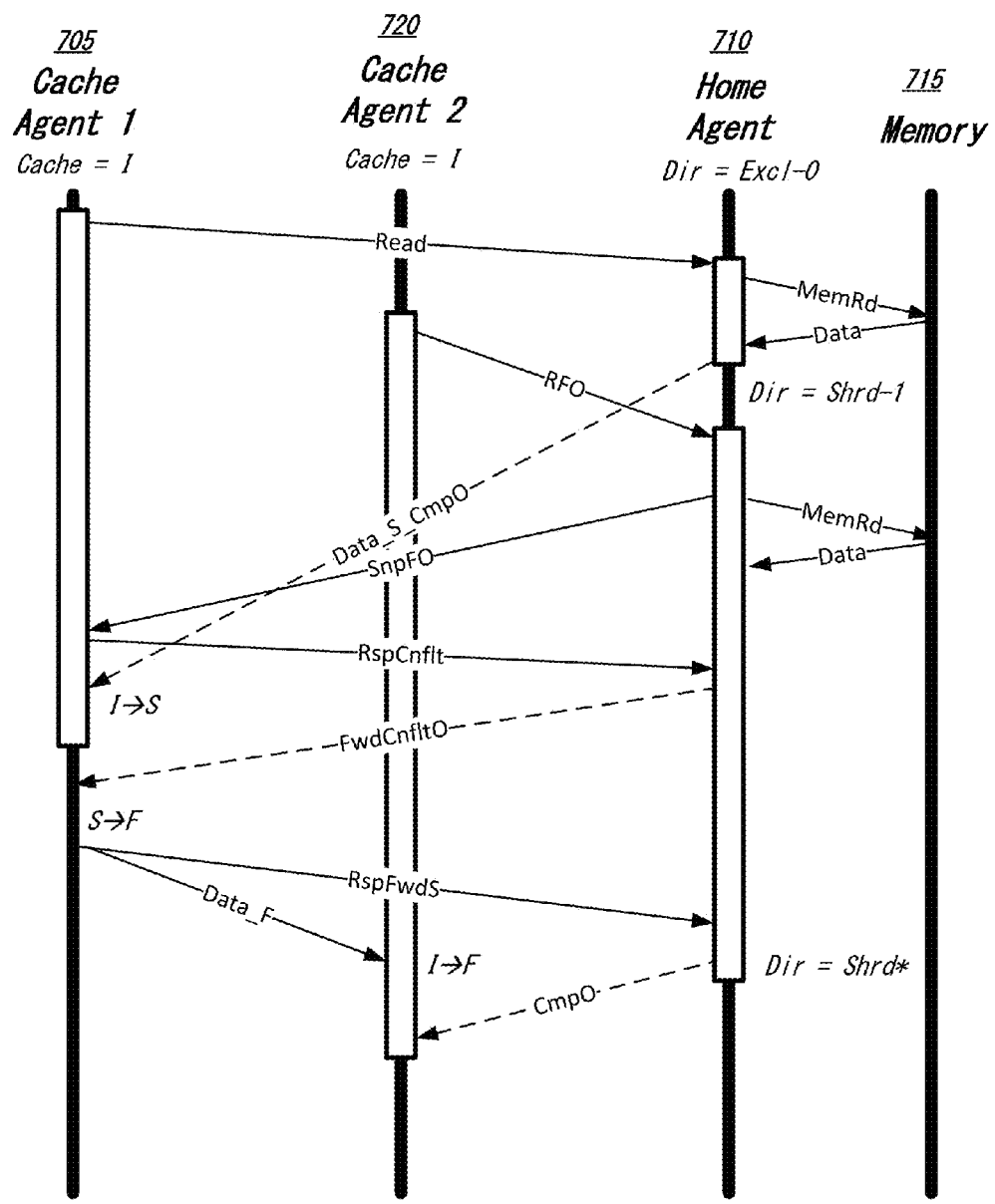
FIG. 7 illustrates a flow diagram of example coherence protocol conflict management.

Turning to FIG. 7, a first example is illustrated of an example conflict management scheme. A first cache (or coherence) agent 705 can send a read request for a particular line of data to home agent 710 resulting in a read of memory 715. Shortly after the read request by cache agent 705, another cache agent 720 makes a request for ownership (RFO) of the same line. However, the home agent 710 has sent the Data_S_CmpO to the first cache agent 705 prior to receiving the RFO from cache agent 720. The RFO can result in a snoop (SnpFO) being sent to the cache agent 705 (as well as other cache agents), the snoop being received by the first cache agent 705 prior to receiving the complete Data_S_CmpO. The cache agent 705, upon receiving the snoop SnpO can identify a potential conflict involving the line of memory requested in its original read request and can notify the home agent 710 of the conflict by responding to the SnpO with a forward responses conflict message (RspCnflt). The home agent 710 can respond to the forward response RspCnflt by sending a forward response (FwdCnfltO). The cache agent 705 can then receive the shared data complete Data_S_CmpO and transition from an I state to S state. The forward response FwdCnfltO can then be received by the cache agent 705 and cache agent 705 can determine how to respond to the forward response message FwdClfltO based on the snoop SnpFO that triggered the sending of the forward response RspCnflt. In this example, the cache agent 705 can consult a protocol state table, for instance, to determine a response to the forward response message FwdClfltO. In the particular example of FIG. 7, the cache agent 705 can transition to an F-state and send the S-copy of the data it received from the home agent 710 in the Data_S_CmpO message to the second cache agent 720 in a Data_F message. The first cache agent 705 can also send a response message RspFwdS to the home agent 710 notifying the home agent 710 that the first cache agent has shared its copy of the data with the second cache agent.

Figure 8:
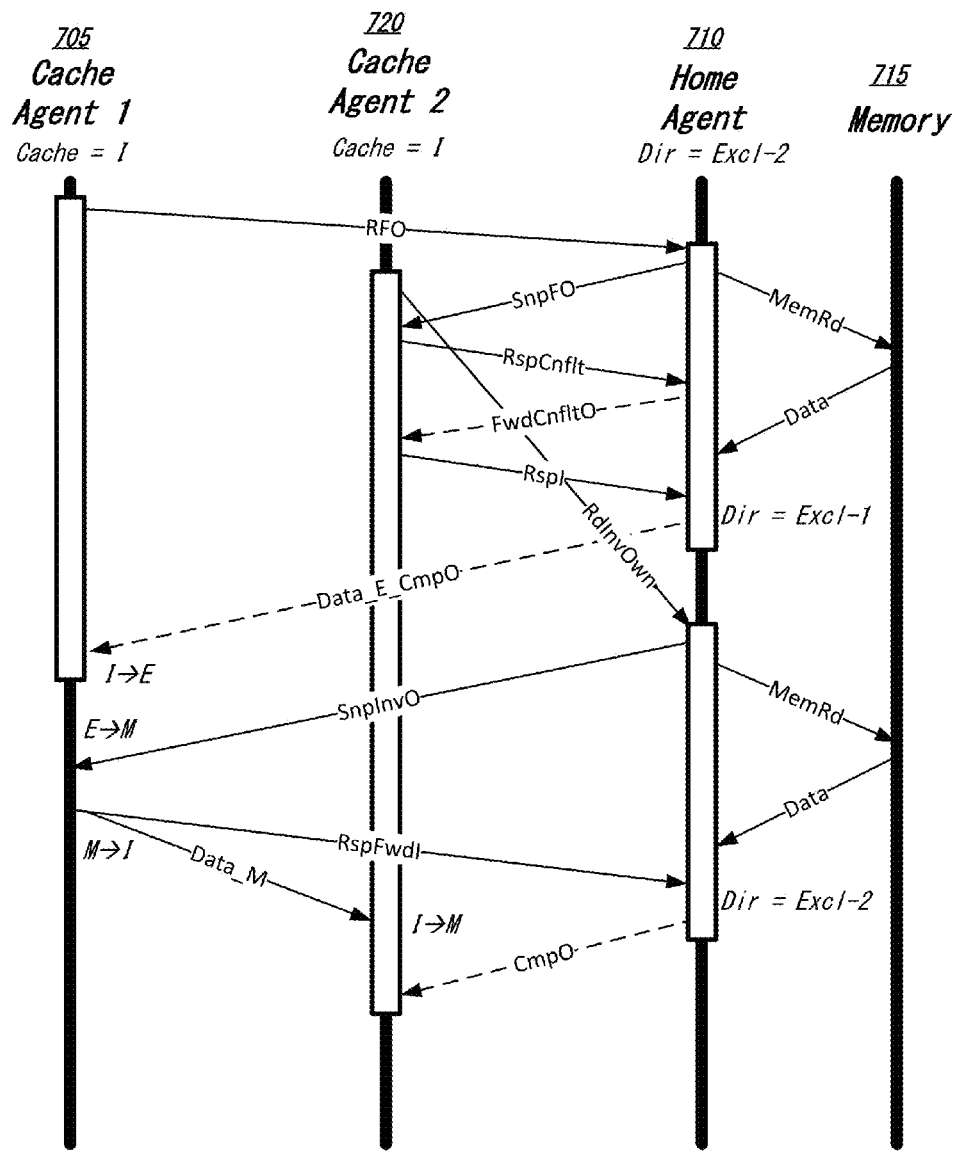
FIG. 8 illustrates a flow diagram of another example coherence protocol conflict management.

In another illustrative example, shown in the simplified flow diagram of FIG. 8, the first cache agent 705 can send a request for ownership (RFO) of a particular line of memory to the home agent 710. Shortly thereafter, a second cache agent can send a RdInvOwn message to the home agent 710 as a request for the same line of memory in an M state. In connection with the RFO message from the first cache agent 705, the home agent 710 can send a snoop (SnpFO) to the second cache agent 720 which the second cache agent 720 can identify as a potential conflict involving the line of memory subject to both the RFO and RdInvOwn requests. Accordingly, the second cache agent 720 can send a forward request RspCnflt to the home agent 720. The home agent 720 responds to the second cache agent's 720 forward request with a forward response. The second cache agent 720 determines a response to the forward response based on information contained in the original snoop SnpFO. In this example, the second cache agent 720 responds with a snoop response RspI indicating that the second cache agent 720 is in an I-state. The home agent 710 receives the snoop response RspI and determines that it is appropriate to send the data complete exclusive (Data_E_CmpO) to the first cache agent 705, which causes the first cache agent to transition to an E state. With the complete sent, the home agent 710 can then begin responding to the second cache agent's RdInvOwn request, beginning with a snoop request SnpInvO of the first cache agent 705. The first cache agent 705 can identify that the snoop results in a request by the second cache agent 720 to obtain an exclusive M-state copy of the line. Consequently, the first cache agent 705 transitions to the M state to send its copy of the line as an M-state copy (with Data_M message) to the second cache agent 720. Additionally, the first cache agent 705 also sends a response message RspFwdI to indicate that the copy of the line has been sent to the second cache agent 720 and that the first cache agent has transitioned to an I-state (having given up ownership of the copy to the second cache agent 720).

Figure 9:
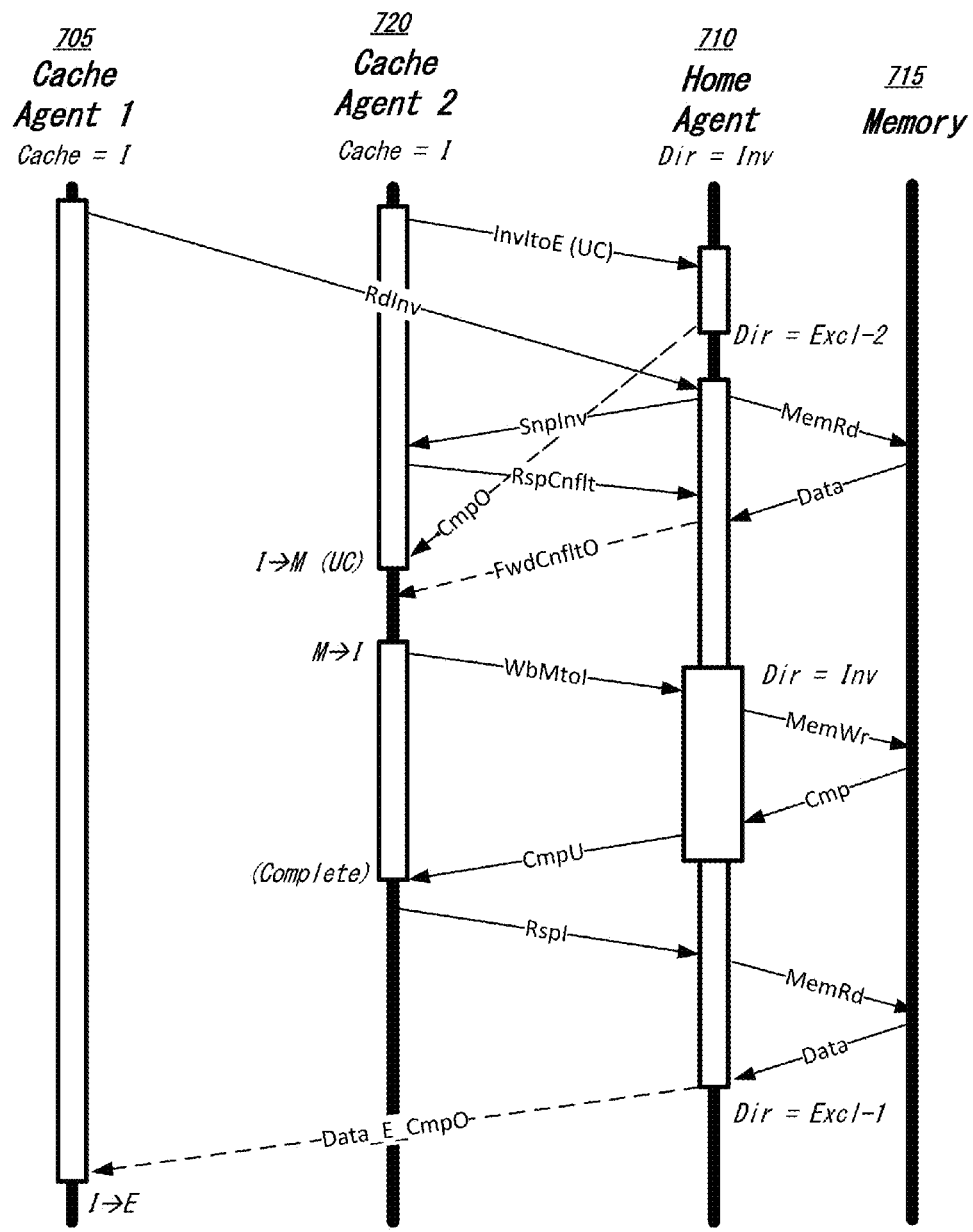
FIG. 9 illustrates a flow diagram of another example coherence protocol conflict management.

Turning next to the example of FIG. 9, another simplified flowchart is shown. In this example, a cache agent 720 attempts to request exclusive ownership of an uncacheable (UC) line without receiving data (e.g., through a InvItoE message). A first cache agent 705 send a competing message (RdInv) for the cache line in E state. The HPI Coherence protocol can specify that if the requested line was previously cached in M state, the line will be written to memory before E data is delivered in response to the RdInv of the first cache agent 705. The home agent 710 can send a complete (CmpO) to the InvItoE request and send a snoop (SnpInv) to cache agent 720 based on the RdInv request. If the cache agent 720 receives the snoop before the complete, the cache agent 720 can identify that the snoop pertains to the same cache line as its exclusive ownership request and indicate a conflict through a forward requests RspCnflt. As in previous examples, the home agent 710 can be configured to respond to the forward request with a forward response (FwdCnfltO). Multiple permissible responses may be allowed to the forward response. For instance, the cache agent 720 can initiate an explicit writeback (e.g., WbMtoI) and block the snoop (or forward) until the explicit writeback is completed (e.g., CmpU), as shown in the example of FIG. 9. The cache agent can then complete the snoop response (RspI). The home agent 710 can then process the RdInv request of the first cache agent 705 and return a complete Data_E_CmpO, among other examples.

In examples, such as the example of FIG. 9, where a cache agent receives a snoop when the agent has an outstanding read or invalidation request to the same address and it has cached a partial modified line (often referred to as a "buried-M"), the HPI Coherence protocol, in one implementation, allows the agent to either 1) perform an explicit writeback (partial) of the line while blocking the snoop or 2) send a forward request (RspCnflt) to the home agent. If (1) is chosen, the agent processes the snoop after receiving the complete for the writeback. If (2) is chosen, it is possible that the agent will receive forward response (FwdCnfltO) while its outstanding read or invalidation request is still waiting for responses and the agent still has a partial modified line. If that is the case, the protocol allows the agent to block the forward while performing an explicit writeback (partial) of the line. During the writeback, the protocol guarantees the agent will not receive responses for the outstanding read or invalidation request. The mechanism described above (allowing coherence agents to issue explicit writebacks and block snoops and forwards, even when the agent has an outstanding read or invalidation request) is also used to ensure partial or UC writes are posted to memory before the writer acquires global observability.

Coherence agents use a two-step process for partial/UC writes. First, they check if they have ownership of the cacheline and issue an ownership (invalidation) request in the protocol if they do not. Second, they perform the write. In the first step, if they performed an ownership request, it is possible that the request will conflict with other agents' requests for the line, meaning the agent might receive a snoop while the ownership request is outstanding. Per coherence protocol requirements, the agent will issue a forward request for the conflicting snoop. While waiting for the forward response, the agent may receive the ownership request's completion, which grants ownership of the line to the agent and allows the agent to initiate the writeback for the partial/UC write. While this is occurring, the agent might receive the forward response, which it is obligated to process also. The coherence agent may not combine the two activities. The coherence agent is to instead writeback the partial/UC write data separately from processing the forward, and perform the writeback first. For instance, a cache agent may use a writeback request to commit UC data before processing forward and writeback partial cache lines, among other examples and features.

HPI can be incorporated in any variety of computing devices and systems, including mainframes, server systems, personal computers, mobile computers (such as tablets, smartphones, personal digital systems, etc.), smart appliances, gaming or entertainment consoles and set top boxes, among other examples. For instance, referring to FIG. 10, an embodiment of a block diagram for a computing system including a multicore processor is depicted. Processor 1000 includes any processor or processing device, such as a microprocessor, an embedded processor, a digital signal processor (DSP), a network processor, a handheld processor, an application processor, a co-processor, a system on a chip (SOC), or other device to execute code. Processor 1000, in one embodiment, includes at least two cores-core 1001 and 1002, which may include asymmetric cores or symmetric cores (the illustrated embodiment). However, processor 1000 may include any number of processing elements that may be symmetric or asymmetric.

In one embodiment, a processing element refers to hardware or logic to support a software thread. Examples of hardware processing elements include: a thread unit, a thread slot, a thread, a process unit, a context, a context unit, a logical processor, a hardware thread, a core, and/or any other element, which is capable of holding a state for a processor, such as an execution state or architectural state. In other words, a processing element, in one embodiment, refers to any hardware capable of being independently associated with code, such as a software thread, operating system, application, or other code. A physical processor (or processor socket) typically refers to an integrated circuit, which potentially includes any number of other processing elements, such as cores or hardware threads.

A core often refers to logic located on an integrated circuit capable of maintaining an independent architectural state, wherein each independently maintained architectural state is associated with at least some dedicated execution resources. In contrast to cores, a hardware thread typically refers to any logic located on an integrated circuit capable of maintaining an independent architectural state, wherein the independently maintained architectural states share access to execution resources. As can be seen, when certain resources are shared and others are dedicated to an architectural state, the line between the nomenclature of a hardware thread and core overlaps. Yet often, a core and a hardware thread are viewed by an operating system as individual logical processors, where the operating system is able to individually schedule operations on each logical processor.

Figure 10:
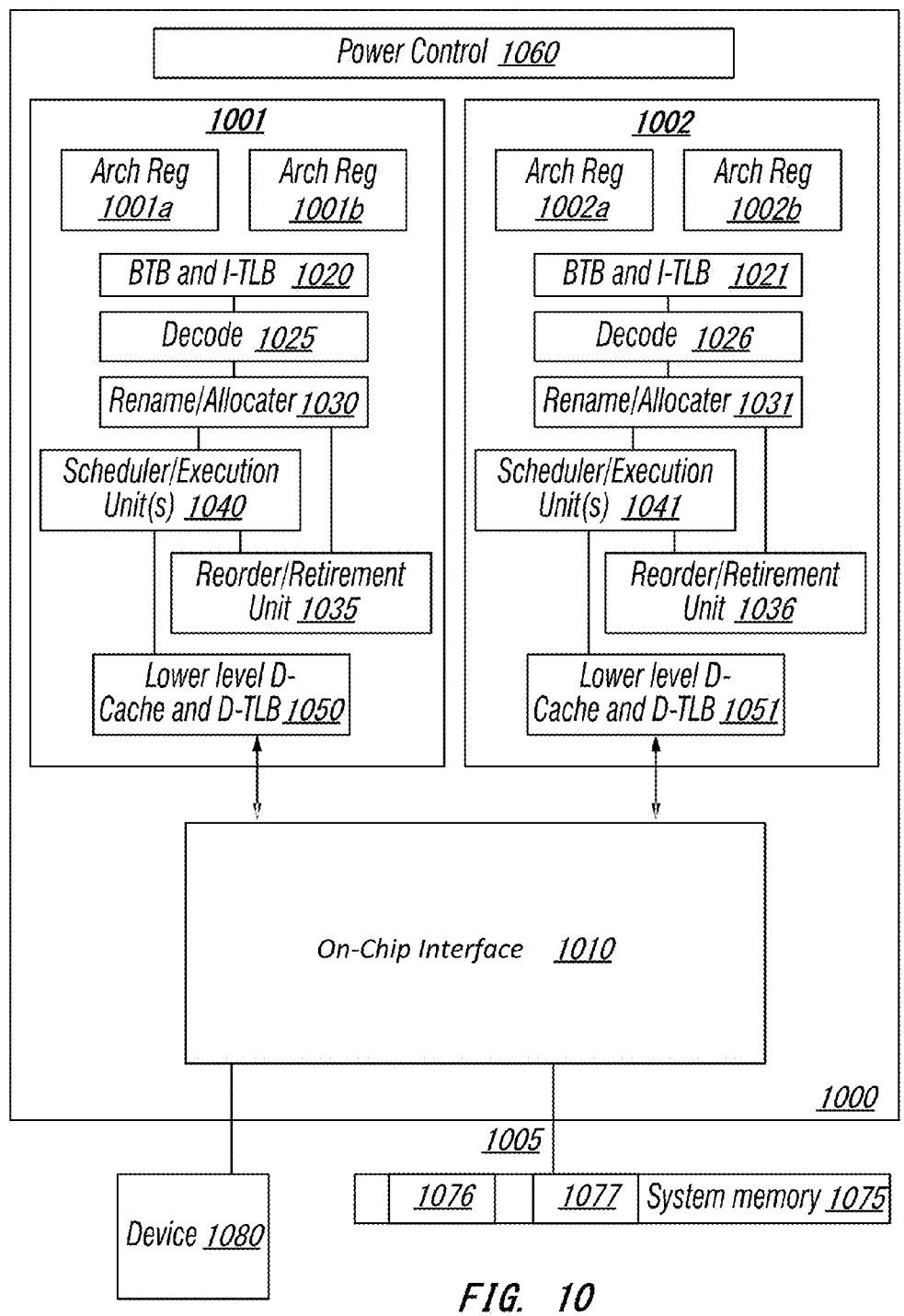
FIG. 10 illustrates an embodiment of a block diagram for a computing system including a multicore processor.

Physical processor 1000, as illustrated in FIG. 10, includes two cores-core 1001 and 1002. Here, core 1001 and 1002 are considered symmetric cores, i.e. cores with the same configurations, functional units, and/or logic. In another embodiment, core 1001 includes an out-of-order processor core, while core 1002 includes an in-order processor core. However, cores 1001 and 1002 may be individually selected from any type of core, such as a native core, a software managed core, a core adapted to execute a native Instruction Set Architecture (ISA), a core adapted to execute a translated Instruction Set Architecture (ISA), a co-designed core, or other known core. In a heterogeneous core environment (i.e. asymmetric cores), some form of translation, such a binary translation, may be utilized to schedule or execute code on one or both cores. Yet to further the discussion, the functional units illustrated in core 1001 are described in further detail below, as the units in core 1002 operate in a similar manner in the depicted embodiment.

As depicted, core 1001 includes two hardware threads 1001a and 1001b, which may also be referred to as hardware thread slots 1001a and 1001b. Therefore, software entities, such as an operating system, in one embodiment potentially view processor 1000 as four separate processors, i.e., four logical processors or processing elements capable of executing four software threads concurrently. As alluded to above, a first thread is associated with architecture state registers 1001a, a second thread is associated with architecture state registers 1001b, a third thread may be associated with architecture state registers 1002a, and a fourth thread may be associated with architecture state registers 1002b. Here, each of the architecture state registers (1001a, 1001b, 1002a, and 1002b) may be referred to as processing elements, thread slots, or thread units, as described above. As illustrated, architecture state registers 1001a are replicated in architecture state registers 1001b, so individual architecture states/contexts are capable of being stored for logical processor 1001a and logical processor 1001b. In core 1001, other smaller resources, such as instruction pointers and renaming logic in allocator and renamer block 1030 may also be replicated for threads 1001a and 1001b. Some resources, such as re-order buffers in reorder/retirement unit 1035, ILTB 1020, load/store buffers, and queues may be shared through partitioning. Other resources, such as general purpose internal registers, page-table base register(s), low-level data-cache and data-TLB 1051, execution unit(s) 1040, and portions of out-of-order unit 1035 are potentially fully shared.

Processor 1000 often includes other resources, which may be fully shared, shared through partitioning, or dedicated by/to processing elements. In FIG. 10, an embodiment of a purely exemplary processor with illustrative logical units/resources of a processor is illustrated. Note that a processor may include, or omit, any of these functional units, as well as include any other known functional units, logic, or firmware not depicted. As illustrated, core 1001 includes a simplified, representative out-of-order (OOO) processor core. But an in-order processor may be utilized in different embodiments. The OOO core includes a branch target buffer 1020 to predict branches to be executed/taken and an instruction-translation buffer (I-TLB) 1020 to store address translation entries for instructions.

Core 1001 further includes decode module 1025 coupled to fetch unit 1020 to decode fetched elements. Fetch logic, in one embodiment, includes individual sequencers associated with thread slots 1001a, 1001b, respectively. Usually core 1001 is associated with a first ISA, which defines/specifies instructions executable on processor 1000. Often machine code instructions that are part of the first ISA include a portion of the instruction (referred to as an opcode), which references/specifies an instruction or operation to be performed. Decode logic 1025 includes circuitry that recognizes these instructions from their opcodes and passes the decoded instructions on in the pipeline for processing as defined by the first ISA. For example, as discussed in more detail below decoders 1025, in one embodiment, include logic designed or adapted to recognize specific instructions, such as transactional instruction. As a result of the recognition by decoders 1025, the architecture or core 1001 takes specific, predefined actions to perform tasks associated with the appropriate instruction. It is important to note that any of the tasks, blocks, operations, and methods described herein may be performed in response to a single or multiple instructions; some of which may be new or old instructions. Note decoders 1026, in one embodiment, recognize the same ISA (or a subset thereof). Alternatively, in a heterogeneous core environment, decoders 1026 recognize a second ISA (either a subset of the first ISA or a distinct ISA).

In one example, allocator and renamer block 1030 includes an allocator to reserve resources, such as register files to store instruction processing results. However, threads 1001a and 1001b are potentially capable of out-of-order execution, where allocator and renamer block 1030 also reserves other resources, such as reorder buffers to track instruction results. Unit 1030 may also include a register renamer to rename program/instruction reference registers to other registers internal to processor 1000. Reorder/retirement unit 1035 includes components, such as the reorder buffers mentioned above, load buffers, and store buffers, to support out-of-order execution and later in-order retirement of instructions executed out-of-order.

Scheduler and execution unit(s) block 1040, in one embodiment, includes a scheduler unit to schedule instructions/operation on execution units. For example, a floating point instruction is scheduled on a port of an execution unit that has an available floating point execution unit. Register files associated with the execution units are also included to store information instruction processing results. Exemplary execution units include a floating point execution unit, an integer execution unit, a jump execution unit, a load execution unit, a store execution unit, and other known execution units.

Lower level data cache and data translation buffer (D-TLB) 1050 are coupled to execution unit(s) 1040. The data cache is to store recently used/operated on elements, such as data operands, which are potentially held in memory coherency states. The D-TLB is to store recent virtual/linear to physical address translations. As a specific example, a processor may include a page table structure to break physical memory into a plurality of virtual pages.

Here, cores 1001 and 1002 share access to higher-level or further-out cache, such as a second level cache associated with on-chip interface 1010. Note that higher-level or further-out refers to cache levels increasing or getting further away from the execution unit(s). In one embodiment, higher-level cache is a last-level data cache—last cache in the memory hierarchy on processor 1000—such as a second or third level data cache. However, higher level cache is not so limited, as it may be associated with or include an instruction cache. A trace cache—a type of instruction cache—instead may be coupled after decoder 1025 to store recently decoded traces. Here, an instruction potentially refers to a macro-instruction (i.e. a general instruction recognized by the decoders), which may decode into a number of micro-instructions (micro-operations).

In the depicted configuration, processor 1000 also includes on-chip interface module 1010. Historically, a memory controller, which is described in more detail below, has been included in a computing system external to processor 1000. In this scenario, on-chip interface 101 is to communicate with devices external to processor 1000, such as system memory 1075, a chipset (often including a memory controller hub to connect to memory 1075 and an I/O controller hub to connect peripheral devices), a memory controller hub, a northbridge, or other integrated circuit. And in this scenario, bus 1005 may include any known interconnect, such as multi-drop bus, a point-to-point interconnect, a serial interconnect, a parallel bus, a coherent (e.g. cache coherent) bus, a layered protocol architecture, a differential bus, and a GTL bus.

Memory 1075 may be dedicated to processor 1000 or shared with other devices in a system. Common examples of types of memory 1075 include DRAM, SRAM, non-volatile memory (NV memory), and other known storage devices. Note that device 1080 may include a graphic accelerator, processor or card coupled to a memory controller hub, data storage coupled to an I/O controller hub, a wireless transceiver, a flash device, an audio controller, a network controller, or other known device.

Recently however, as more logic and devices are being integrated on a single die, such as SOC, each of these devices may be incorporated on processor 1000. For example in one embodiment, a memory controller hub is on the same package and/or die with processor 1000. Here, a portion of the core (an on-core portion) 1010 includes one or more controller(s) for interfacing with other devices such as memory 1075 or a graphics device 1080. The configuration including an interconnect and controllers for interfacing with such devices is often referred to as an on-core (or un-core configuration). As an example, on-chip interface 1010 includes a ring interconnect for on-chip communication and a high-speed serial point-to-point link 1005 for off-chip communication. Yet, in the SOC environment, even more devices, such as the network interface, co-processors, memory 1075, graphics processor 1080, and any other known computer devices/interface may be integrated on a single die or integrated circuit to provide small form factor with high functionality and low power consumption.

In one embodiment, processor 1000 is capable of executing a compiler, optimization, and/or translator code 1077 to compile, translate, and/or optimize application code 1076 to support the apparatus and methods described herein or to interface therewith. A compiler often includes a program or set of programs to translate source text/code into target text/code. Usually, compilation of program/application code with a compiler is done in multiple phases and passes to transform hi-level programming language code into low-level machine or assembly language code. Yet, single pass compilers may still be utilized for simple compilation. A compiler may utilize any known compilation techniques and perform any known compiler operations, such as lexical analysis, preprocessing, parsing, semantic analysis, code generation, code transformation, and code optimization.

Larger compilers often include multiple phases, but most often these phases are included within two general phases: (1) a front-end, i.e. generally where syntactic processing, semantic processing, and some transformation/optimization may take place, and (2) a back-end, i.e. generally where analysis, transformations, optimizations, and code generation takes place. Some compilers refer to a middle, which illustrates the blurring of delineation between a front-end and back end of a compiler. As a result, reference to insertion, association, generation, or other operation of a compiler may take place in any of the aforementioned phases or passes, as well as any other known phases or passes of a compiler. As an illustrative example, a compiler potentially inserts operations, calls, functions, etc. in one or more phases of compilation, such as insertion of calls/operations in a front-end phase of compilation and then transformation of the calls/operations into lower-level code during a transformation phase. Note that during dynamic compilation, compiler code or dynamic optimization code may insert such operations/calls, as well as optimize the code for execution during runtime. As a specific illustrative example, binary code (already compiled code) may be dynamically optimized during runtime. Here, the program code may include the dynamic optimization code, the binary code, or a combination thereof.

Similar to a compiler, a translator, such as a binary translator, translates code either statically or dynamically to optimize and/or translate code. Therefore, reference to execution of code, application code, program code, or other software environment may refer to: (1) execution of a compiler program(s), optimization code optimizer, or translator either dynamically or statically, to compile program code, to maintain software structures, to perform other operations, to optimize code, or to translate code; (2) execution of main program code including operations/calls, such as application code that has been optimized/compiled; (3) execution of other program code, such as libraries, associated with the main program code to maintain software structures, to perform other software related operations, or to optimize code; or (4) a combination thereof.

While the present invention has been described with respect to a limited number of embodiments, those skilled in the art will appreciate numerous modifications and variations therefrom. It is intended that the appended claims cover all such modifications and variations as fall within the true spirit and scope of this present invention.

A design may go through various stages, from creation to simulation to fabrication. Data representing a design may represent the design in a number of manners. First, as is useful in simulations, the hardware may be represented using a hardware description language or another functional description language. Additionally, a circuit level model with logic and/or transistor gates may be produced at some stages of the design process. Furthermore, most designs, at some stage, reach a level of data representing the physical placement of various devices in the hardware model. In the case where conventional semiconductor fabrication techniques are used, the data representing the hardware model may be the data specifying the presence or absence of various features on different mask layers for masks used to produce the integrated circuit. In any representation of the design, the data may be stored in any form of a machine readable medium. A memory or a magnetic or optical storage such as a disc may be the machine readable medium to store information transmitted via optical or electrical wave modulated or otherwise generated to transmit such information. When an electrical carrier wave indicating or carrying the code or design is transmitted, to the extent that copying, buffering, or re-transmission of the electrical signal is performed, a new copy is made. Thus, a communication provider or a network provider may store on a tangible, machine-readable medium, at least temporarily, an article, such as information encoded into a carrier wave, embodying techniques of embodiments of the present invention.

A module as used herein refers to any combination of hardware, software, and/or firmware. As an example, a module includes hardware, such as a micro-controller, associated with a non-transitory medium to store code adapted to be executed by the micro-controller. Therefore, reference to a module, in one embodiment, refers to the hardware, which is specifically configured to recognize and/or execute the code to be held on a non-transitory medium. Furthermore, in another embodiment, use of a module refers to the non-transitory medium including the code, which is specifically adapted to be executed by the microcontroller to perform predetermined operations. And as can be inferred, in yet another embodiment, the term module (in this example) may refer to the combination of the microcontroller and the non-transitory medium. Often module boundaries that are illustrated as separate commonly vary and potentially overlap. For example, a first and a second module may share hardware, software, firmware, or a combination thereof, while potentially retaining some independent hardware, software, or firmware. In one embodiment, use of the term logic includes hardware, such as transistors, registers, or other hardware, such as programmable logic devices.

Use of the phrase 'configured to,' in one embodiment, refers to arranging, putting together, manufacturing, offering to sell, importing and/or designing an apparatus, hardware, logic, or element to perform a designated or determined task. In this example, an apparatus or element thereof that is not operating is still 'configured to' perform a designated task if it is designed, coupled, and/or interconnected to perform said designated task. As a purely illustrative example, a logic gate may provide a 0 or a 1 during operation. But a logic gate 'configured to' provide an enable signal to a clock does not include every potential logic gate that may provide a 1 or 0. Instead, the logic gate is one coupled in some manner that during operation the 1 or 0 output is to enable the clock. Note once again that use of the term 'configured to' does not require operation, but instead focus on the latent state of an apparatus, hardware, and/or element, where in the latent state the apparatus, hardware, and/or element is designed to perform a particular task when the apparatus, hardware, and/or element is operating.

Furthermore, use of the phrases 'to,' 'capable of/to,' and or 'operable to,' in one embodiment, refers to some apparatus, logic, hardware, and/or element designed in such a way to enable use of the apparatus, logic, hardware, and/or element in a specified manner. Note as above that use of to, capable to, or operable to, in one embodiment, refers to the latent state of an apparatus, logic, hardware, and/or element, where the apparatus, logic, hardware, and/or element is not operating but is designed in such a manner to enable use of an apparatus in a specified manner.

A value, as used herein, includes any known representation of a number, a state, a logical state, or a binary logical state. Often, the use of logic levels, logic values, or logical values is also referred to as 1's and 0's, which simply represents binary logic states. For example, a 1 refers to a high logic level and 0 refers to a low logic level. In one embodiment, a storage cell, such as a transistor or flash cell, may be capable of holding a single logical value or multiple logical values. However, other representations of values in computer systems have been used. For example the decimal number ten may also be represented as a binary value of 1010 and a hexadecimal letter A. Therefore, a value includes any representation of information capable of being held in a computer system.

Moreover, states may be represented by values or portions of values. As an example, a first value, such as a logical one, may represent a default or initial state, while a second value, such as a logical zero, may represent a non-default state. In addition, the terms reset and set, in one embodiment, refer to a default and an updated value or state, respectively. For example, a default value potentially includes a high logical value, i.e. reset, while an updated value potentially includes a low logical value, i.e. set. Note that any combination of values may be utilized to represent any number of states.

The embodiments of methods, hardware, software, firmware or code set forth above may be implemented via instructions or code stored on a machine-accessible, machine readable, computer accessible, or computer readable medium which are executable by a processing element. A non-transitory machine-accessible/readable medium includes any mechanism that provides (i.e., stores and/or transmits) information in a form readable by a machine, such as a computer or electronic system. For example, a non-transitory machine-accessible medium includes random-access memory (RAM), such as static RAM (SRAM) or dynamic RAM (DRAM); ROM; magnetic or optical storage medium; flash memory devices; electrical storage devices; optical storage devices; acoustical storage devices; other form of storage devices for holding information received from transitory (propagated) signals (e.g., carrier waves, infrared signals, digital signals); etc, which are to be distinguished from the non-transitory mediums that may receive information there from.

Instructions used to program logic to perform embodiments of the invention may be stored within a memory in the system, such as DRAM, cache, flash memory, or other storage. Furthermore, the instructions can be distributed via a network or by way of other computer readable media. Thus a machine-readable medium may include any mechanism for storing or transmitting information in a form readable by a machine (e.g., a computer), but is not limited to, floppy diskettes, optical disks, Compact Disc, Read-Only Memory (CD-ROMs), and magneto-optical disks, Read-Only Memory (ROMs), Random Access Memory (RAM), Erasable Programmable Read-Only Memory (EPROM), Electrically Erasable Programmable Read-Only Memory (EEPROM), magnetic or optical cards, flash memory, or a tangible, machine-readable storage used in the transmission of information over the Internet via electrical, optical, acoustical or other forms of propagated signals (e.g., carrier waves, infrared signals, digital signals, etc.). Accordingly, the computer-readable medium includes any type of tangible machine-readable medium suitable for storing or transmitting electronic instructions or information in a form readable by a machine (e.g., a computer).

The following examples pertain to embodiments in accordance with this Specification. One or more embodiments may provide an apparatus, a system, a machine readable storage, a machine readable medium, and a method to send a coherence protocol message corresponding to a particular cache line, identify a potential conflict involving the particular cache line, and send a forward request to a home agent to identify the potential conflict.

One or more examples can further provide receiving a snoop corresponding to the particular cache line.

One or more examples can further provide identifying that the snoop is received while a request is outstanding, and the potential conflict is identified based on identifying that the snoop is received while the request is outstanding.

One or more examples can further provide receiving a forward response from the home agent based on the forward request.

One or more examples can further provide determining a response to the forward response based at least in part on attributes of the snoop.

In at least one example, the snoop corresponds to another coherence protocol message by another agent corresponding to the particular cache line, and the attributes of the snoop include identification of the other agent, identification of a command included in the other coherence protocol message, and a transaction identifier of the other coherence protocol message.

In at least one example, the response to the forward response includes a snoop response and the protocol layer logic is further to send the snoop response to the home agent after receiving a completion to the coherence protocol message.

In at least one example, the response comprises performing a writeback to memory prior to sending a snoop response to the home agent.

In at least one example, the particular cache line is partially modified at the agent.

One or more examples can further provide receiving a completion after receiving the forward response.

One or more examples can further provide receiving a completion before receiving the forward response.

One or more examples can further provide allocating a resource for responses to the request.

One or more examples can further provide allocating a forward resource for a forward responses to the forward request.

One or more embodiments may provide an apparatus, a system, a machine readable storage, a machine readable medium, and a method to receive a first coherence protocol request from a first cache agent, send a snoop request to a second cache agent, wherein the snoop request corresponds to the first coherence protocol request, receive a forward request from the second cache agent corresponding to the snoop request, wherein the forward request identifies a potential conflict with the first coherence protocol request, and send a forward response to the second cache agent in response to the forward request.

One or more examples can further provide receiving another coherence protocol request from the second cache agent, wherein the first coherence protocol request and the other coherence protocol request each pertain to a common cache line.

In at least one example, the other coherence protocol request is received by the agent before the first coherence protocol request, and the protocol layer logic is further to process the other coherence protocol request and return a complete message to the other coherence protocol request.

One or more examples can further provide receiving a response from the second agent to the forward response and generate a complete to the first coherence protocol request upon receiving the response to the forward response.

In at least one example, the agent comprises a home agent.

One or more examples can further provide system with an interconnect fabric, a home agent to service requests to a coherent memory space, and a cache agent communicatively coupled to the home agent via the interconnect fabric. The interconnect fabric can ensure ordering of the response to the snoop and the complete for the other coherency protocol request. The home agent can have a set of resources and the set of resources are not pre-allocated to cache agents in the system.

One or more examples can further provide an agent including a layered protocol stack including a protocol layer, wherein the protocol layer is to initiate an allocation of resources, without home agent intervention, to process a first request in response to the agent receiving the first request, and to initiate an allocation of resources, without home agent intervention, to process responses to a second request in response to the agent transmitting the second request.

In at least one example, allocation of resources includes on of: HTID, RNID, RTID, or a combination thereof.

In at least one example, allocation of resources includes on of: resources to process snoop requests and forward responses.

One or more examples can further provide an agent including a layered protocol stack including a protocol layer, wherein the protocol layer is to imitate use of an ordered response channel to perform conflict resolution.

One or more examples can further provide a coherence agent including a layered protocol stack including a protocol layer, wherein the protocol layer is to block a forward for a writeback request to maintain data consistency.

In at least one example, the protocol layer is to initiate a writeback request to commit unchacheable data before processing the forward In at least one example, the protocol layer is further to support explicit writeback of partial cache lines.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

In the foregoing specification, a detailed description has been given with reference to specific exemplary embodiments. It will, however, be evident that various modifications and changes may be made thereto without departing from the broader spirit and scope of the invention as set forth in the appended claims. The specification and drawings are, accordingly, to be regarded in an illustrative sense rather than a restrictive sense. Furthermore, the foregoing use of embodiment and other exemplarily language does not necessarily refer to the same embodiment or the same example, but may refer to different and distinct embodiments, as well as potentially the same embodiment.

What is claimed is:

1. An apparatus comprising:
   an agent including protocol layer logic implemented at least in part in hardware, wherein the protocol layer logic is to:
   send a coherence protocol message corresponding to a particular cache line;
   receive a snoop corresponding to the particular cache line, wherein the snoop comprises a home transaction identifier corresponding to a resource of a home agent allocated by the home agent in association with a transaction involving the particular cache line and the snoop further comprises a requester transaction identifier corresponding to a resource of a requesting agent in the transaction;
   identify a potential conflict involving the particular cache line based on receipt of the snoop;
   send a forward request to the home agent to identify the potential conflict to the home agent, wherein the forward request comprises a node identifier of the home agent and the home transaction identifier;
   receive, from the home agent, a forward response to the forward request, wherein the forward response comprises the home transaction identifier; and
   send a response to the home agent in response to the forward response.

2. The apparatus of claim 1, wherein the message comprises a request involving the particular cache line, the protocol layer logic is to identify that the snoop is received while the request is outstanding, and the potential conflict is identified based on identifying that the snoop is received while the request is outstanding.

3. The apparatus of claim 1, wherein the protocol layer logic is further to generate the response to the forward response based at least in part on attributes of the snoop.

4. The apparatus of claim 3, wherein the snoop corresponds to another coherence protocol message by another agent corresponding to the particular cache line, and the attributes of the snoop include identification of the other agent, identification of a command included in the other coherence protocol message, and the requester transaction identifier comprises a transaction identifier included in the other coherence protocol message and corresponds to the other agent.

5. The apparatus of claim 3, wherein the response to the forward response includes a snoop response and the protocol layer logic is further to send the snoop response to the home agent after receiving a completion to the coherence protocol message.

6. The apparatus of claim 3, wherein the response comprises performing a writeback to memory prior to sending a snoop response to the home agent.

7. The apparatus of claim 6, wherein the particular cache line is partially modified at the agent.

8. The apparatus of claim 1, wherein the protocol layer logic is further to receive a completion after receiving the forward response.

9. The apparatus of claim 1, wherein the protocol layer logic is further to receive a completion before receiving the forward response.

10. The apparatus of claim 1, wherein the protocol layer logic is further to allocate a resource for responses to the coherency protocol message.

11. The apparatus of claim 10, wherein the protocol layer logic is further to allocate a forward resource corresponding to each forward request sent to a home agent.

12. An apparatus comprising:
a home agent including protocol layer logic implemented at least in part in hardware, wherein the protocol layer logic is to:
  receive a first coherence protocol request from a first cache agent, wherein the coherence protocol request corresponds to a particular cache address and comprises a requester transaction identifier;
  allocate a resource of the home agent to correspond with processing of the first coherence protocol request;
  send a snoop request to a second cache agent, wherein the snoop request corresponds to the first coherence protocol request and comprises a home transaction identifier corresponding to the resource of the home agent and further comprises the requester transaction identifier;
  receive a forward request from the second cache agent corresponding to the snoop request, wherein the forward request identifies a potential conflict with the first coherence protocol request and comprises a node identifier of the second cache agent and the home transaction identifier; and
  send a forward response to the second cache agent in response to the forward request, wherein the forward response is ordered with at least one complete message corresponding to the particular cache address and comprises the node identifier of the second cache agent and the home transaction identifier.

13. The apparatus of claim 12, wherein the protocol layer logic is further to receive another coherence protocol request from the second cache agent, wherein the first coherence protocol request and the other coherence protocol request each pertain to the particular cache address.

14. The apparatus of claim 13, wherein the other coherence protocol request is received by the agent before the first coherence protocol request, and the protocol layer logic is further to process the other coherence protocol request and the complete message corresponds to the other coherence protocol request.

15. The apparatus of claim 13, wherein the protocol layer logic is further to receive a response from the second cache agent to the forward response and generate a complete to the first coherence protocol request upon receiving the response to the forward response.

16. The apparatus of claim 12, wherein the protocol layer logic is further to allocate a forward resource for the forward response based on the received forward request.

17. A method comprising:
receiving a first coherence protocol request from a first cache agent, wherein the coherence protocol request corresponds to a particular cache address and comprises a requester transaction identifier;
allocating a resource of the home agent to correspond with processing of the first coherence protocol request;
sending a snoop request to a second cache agent, wherein the snoop request corresponds to the first coherence protocol request and comprises a home transaction identifier corresponding to the resource of the home agent and further comprises the requester transaction identifier;
receiving a forward request from the second cache agent corresponding to the snoop request, wherein the forward request identifies a potential conflict with the first coherence protocol request and comprises a node identifier of the second cache agent and the home transaction identifier; and
sending a forward response to the second cache agent in response to the forward request, wherein the forward response is ordered with at least one complete message corresponding to the particular cache address and comprises the node identifier of the second cache agent and the home transaction identifier.

18. The method of claim 17, further comprising receiving another coherence protocol request from the second cache agent, wherein the first coherence protocol request and the other coherence protocol request each pertain to the particular cache address.

19. The method of claim 18, wherein the other coherence protocol request is received prior to the first coherence protocol request, the method further comprising:
processing the other coherence protocol request; and
returning a complete message to the other coherence protocol request.

20. The method of claim 18, further comprising:
receiving a response from the second cache agent to the forward response; and
generating a complete to the first coherence protocol request responsive to receiving the response to the forward response.

21. A system comprising:
an interconnect fabric;
a home agent, implemented at least in part in hardware, to service requests to a coherent memory space;
a cache agent, implemented at least in part in hardware and communicatively coupled to the home agent via the interconnect fabric, the cache agent to:
  send a coherence protocol message corresponding to a particular cache line;
  receive a snoop from a home agent corresponding to the particular cache line, wherein the snoop comprises a home transaction identifier corresponding to a resource of the home agent allocated by the home agent in association with a transaction involving the particular cache line and the snoop further comprises a requester transaction identifier corresponding to a resource of a requesting agent in the transaction;

identify a potential conflict involving the particular cache line based on receipt of the snoop;

send a forward request to the home agent to identify the potential conflict to the home agent, wherein the forward request, wherein the forward request comprises a node identifier of the agent and the home transaction identifier;

receive, from the home agent, a forward response to the forward request, wherein the forward response comprises the home transaction identifier; and send a response to the home agent in response to the forward response.

22. The system of claim 21, wherein the home agent is to:

receive another coherence protocol message from another cache agent;

send the snoop, wherein the snoop corresponds to the coherence protocol message;

receive the forward request;

send the forward response to the cache agent in response to the forward request;

generate a complete for the coherency protocol message; and generate a complete for the other coherency protocol message.

23. The system of claim 22, wherein the response to the forward response is to include sending a response to the snoop to the home agent.

24. The system of claim 23, wherein the interconnect fabric is compliant with a protocol to ensure ordering of the response to the snoop and the complete for the other coherency protocol request.

25. The system of claim 21, wherein the home agent has a set of resources and the set of resources are not pre-allocated to cache agents in the system.

* * * * *